April 12, 1966 L. D. AMDAHL ETAL 3,246,303

STORED LOGIC COMPUTER

Filed Sept. 11, 1961 9 Sheets-Sheet 1

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg
ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

LOWELL D. AMDAHL
GENE M. AMDAHL
HOWARD L. ENGEL
EDWARD J. SCHNEBERGER
JOHN V. BLANKENBAKER
INVENTORS

BY Samuel Lindenberg

ATTORNEY

United States Patent Office 3,246,303
Patented Apr. 12, 1966

3,246,303

STORED LOGIC COMPUTER

Lowell D. Amdahl, Northridge, Calif., Gene M. Amdahl, Chappaqua, N.Y., Howard L. Engel, Woodland Hills, and Edward J. Schneberger, Canoga Park, Calif., and John V. Blankenbaker, Lawrenceville, N.J., assignors to Thompson Ramo Wooldridge Inc., Canoga Park, Calif., a corporation of Ohio Filed Sept. 11, 1961, Ser. No. 137,295
25 Claims. (Cl. 340—172.5)

This invention relates to digital computing devices and more particularly to a computing system wherein the logic which directs the operation of the computer is defined in terms of a series of code sets stored in a memory device rather than in the wired-in structure of the computing system.

This application is a continuation-in-part of an application filed March 7, 1958, for a "Stored Logic Computer," Serial No. 719,888, now abandoned, by the same applicants for the same assignee.

In the conventional digital computing system, command or instruction codes are employed to designate the various operations which are possible. These command codes are stored in a command register, and the signals produced by the register are employed throughout the system to control the operation of various flip-flops or binary digit storage devices. In the complete definition of the system logic, each flip-flop also receives certain timing signals which specify the proper sequence of operation during a computing period, sometimes referred to as a word time interval. The conventional command register storage arrangement is shown, for example, in U.S. Patent No. 2,815,168 to Arthur S. Zukin.

It has been recognized by various people in the art that while the conventional computing system is well adapted to perform ordinary operations, such as addition, subtraction, multiplication, and division, the fixed definition of system logic makes it difficult to program the system for any operation which is not specifically provided for in the command code set. Thus, for example, it is difficult to program a computer to perform square root, computation for sine or cosine, and so forth where such operations are not specifically provided for in the command structure. As a consequence, a technique, known as micro-programming, has been suggested, according to which all operations are specified by a series of micro-orders rather than a single command. This type of system, for example, does not have a command code for multiplication but rather specifies a series of micro-orders, including addition and shift which, as a group, define multiplication.

The advantage of the micro-programming technique is discussed in an article by M. V. Wilkes and J. B. Stringer entitled "Micro-Programming and the Design of the Control Circuits in an Electronic Digital Computer" in the April 1953 issue of Proc. Cambridge Phil. Soc., pp. 230 through 238, and also in an article by Robert J. Mercer entitled "Micro-Programming" in the April 1957 issue of Jour. Assoc. Computing Machinery, pp. 157 through 171.

As is pointed out in these articles, it is possible to avoid the limited versatility of the conventional computing system through the use of micro-programming which may readily be adapted for a wide variety of routines.

In the Wilkes system, the series of micro-orders defining a command are selected through a matrix which is driven in a predetermined sequence constituting the micro-program. Each micro-order, however, is utilized in the conventional manner to control a series of operational steps, each of which is performed as a function of timing signals.

While the micro-programming concept constitutes an important contribution to the digital computing art in enhancing the range of versatility of any given system, it does not readily lend itself to system simplicity. In fact, the system proposed by Mercer is more complicated than a conventional system for the same speed of operation because of its arrangement for micro-programming.

The present invention, on the other hand, introduces the concept of stored logic for computation and permits an extension of system versatility while also making it possible to accomplish a considerable saving in logical structure. In fact, it will be shown that even the most complicated computation can be performed with a single flip-flop as a storage element.

According to the basic concept of the present invention, the computer system logic is defined entirely in terms of stored logic code signals and the signal of a temporary storage device, such as a flip-flop or circulating register. The stored logic code signals do not define micro-orders as in the Wilkes system but rather specify logical functions, such as an "and" function, an "or" function, a transfer of a binary digit, the input or output of a binary digit, and so forth.

In the practice of the present invention, the stored logic code is part of the system logic and is specified for each time interval of operation. Since an operation is made to occur only in response to a stored logic code signal set, it is possible, according to this technique, to eliminate all conventional counting and timing devices since the stored code itself is positioned in time at the desired operational points.

In its basic structural form, one embodiment of the present invention comprises a storage device for producing a predetermined sequence of signal sets, one set being produced during each time interval, corresponding to the stored logic code, the storage device, for example, being a magnetic tape loop or a magnetic drum with a plurality of channels corresponding to the digits of the stored logic code. A storage device is employed to receive input digits which represent a quantity to be operated upon. The computing logic then is mechanized as a function of the signals produced by the storage device and the signal sets defining the stored logic code.

In a more specific form, one embodiment of the invention comprises a storage element L and a register R for receiving input digit signals and producing corresponding output digit signals after a delay. A code storage device is utilized to produce signal sets including bivalued signals S1 and S2 coded to represent the functions: (0) circulate; (1) store; (2) input or output; and (3) logical function. The absence of any function is assumed to signify no change in the variables. A logical network is included which is coupled to storage element L and is responsive to signals S1 and S2 for performing a logical operation corresponding to the code represented by signals S1 and S2.

In the simplest form of the invention, one specified logical function is an "and" function of the signals L and the complement of R. In a similar manner, the same result may be obtained with an "or" function of the signal L and R with the complementation of one of the variables. It will be shown that, with this simple logic and only a single flip-flop, even the most complex computing function can be achieved. The computer mechanization is ideally adapted for high-speed pulse systems which, for example, may employ delay line types of memory. The invention, of course, is not limited to utilization in simple systems.

It is an object of the present invention to provide a computer having the versatility of the prior art micro-programmed computer but with considerable less structural complexity.

Another object is to provide a computing system employing a minimum of logical structure for performing even the most complex operations.

Still another object is to provide a computing system wherein the logic defining the mechanization thereof does not require the use of any counting or timing signals.

A more specific object of the invention is to provide a computing device wherein stored logical codes are utilized as part of the logical definition in order to simplify the computing device structure while also permitting an extension of the range of versatility for the system.

Yet another object of this invention is the provision of a novel, simple and more inexpensive computer system than available heretofore.

The novel features which are believed to be characteristic of the invention, both as to its organization and method of operation, together with further objects and advantages thereof, will be better understood from the following description considered in connection with the accompanying drawings, in which several embodiments of the invention are illustrated by way of example. It is to be expressly understood, however, that the drawings are for the purpose of illustration and description only, and are not intended as a definition of the limits of the invention.

Figure 1:
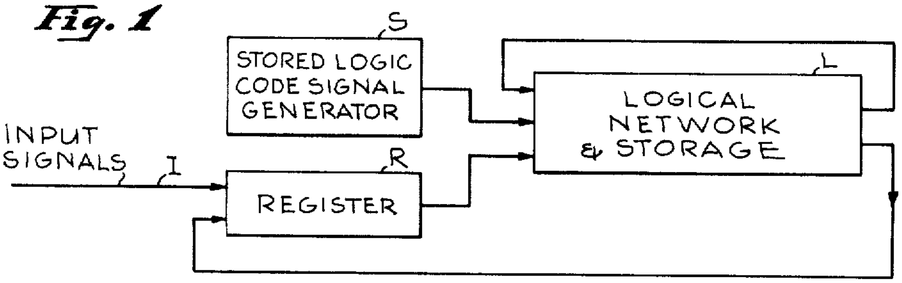
FIGURE 1 is a general block diagram illustrating the basic embodiment of the invention.

Reference is now made to FIGURE 1 wherein the general form of the basic embodiment of the invention is illustrated in block diagram form. As indicated in FIGURE 1, the basic embodiment includes a stored logic code signal generator S which produces signals representing respective stored logic codes. Generator S is coupled to a logic network L which may also include a suitable storage device for retaining the logical signals produced therein for a digit time interval. A register R is provided which may receive input signals and produces output signals which are also applied to logical network L.

It will be noted that certain output signals of network L are re-applied thereto for use in the logical operation thereof and are also applied to register R. Register R is selected to have a predetermined delay so as to provide signals suitable for use in a cyclical operation.

The basic principles of the invention can best be introduced by considering a specific embodiment. Reference for this purpose is made to FIGURE 2 where it will be noted that signal generator S produces signals S1 and S2 defining four stored logic codes. It will also be noted that logic network L includes a flip-flop producing a signal L. It will also be noted that an input circuit 21 is shown coupled to the input of register R and is controlled by signals derived from logic network L, to illustrate the fact that input signals are not received by register R except under the control of the system logic. An output circuit

23 receives signals R and is also controlled by the system logic.

One suitable set of stored logic codes for the embodiment of FIGURE 2 may be specified as follows:

TABLE I

| | S1 | S2 | |
|---|---|---|---|
| (0) | 0 | 0 | toR=R; toL=L |
| (1) | 0 | 1 | toR=input signals; output=R; toL=L |
| (2) | 1 | 0 | toR=R; toL=L.R' |
| (3) | 1 | 1 | toR=L; toL=1 |

The stored logic signals are represented under the columns S1 and S2 in Table I. These stored logic signals always appear as a set. In other words, there is always an S1 and S2 signal. Hereafter the stored logic codes will be represented either by the numbers (0), (1), (2), (3) alluding to the stored logic code signals on the same line as the number or, as will be shown in the drawings, by combinations of S1, S2, S1' and S2' respectively representing the binary valued stored logic signals. Thus, the stored logic code (1) shown in the Table I may also be referred to as S1', S2. Table I shows adjacent the stored logic code the operation which is to be carried out by the computer in response to these signals. The letters "to" prefixed to any symbol indicate a function which is to be entered into a storage device or positioned in a memory. Thus, the expression toR=L means that the contents of the L flip-flop are to be entered into the R register.

Figure 2:
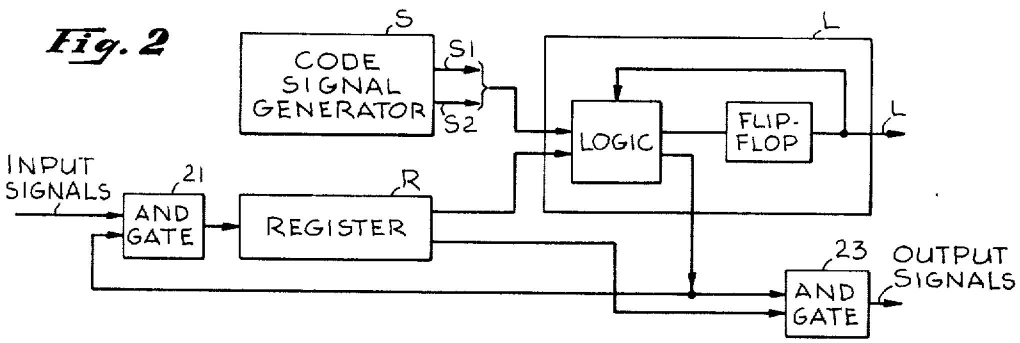
FIGURE 2 is a more detailed block diagram showing one arrangement of the embodiment of the invention.
Figure 2A:
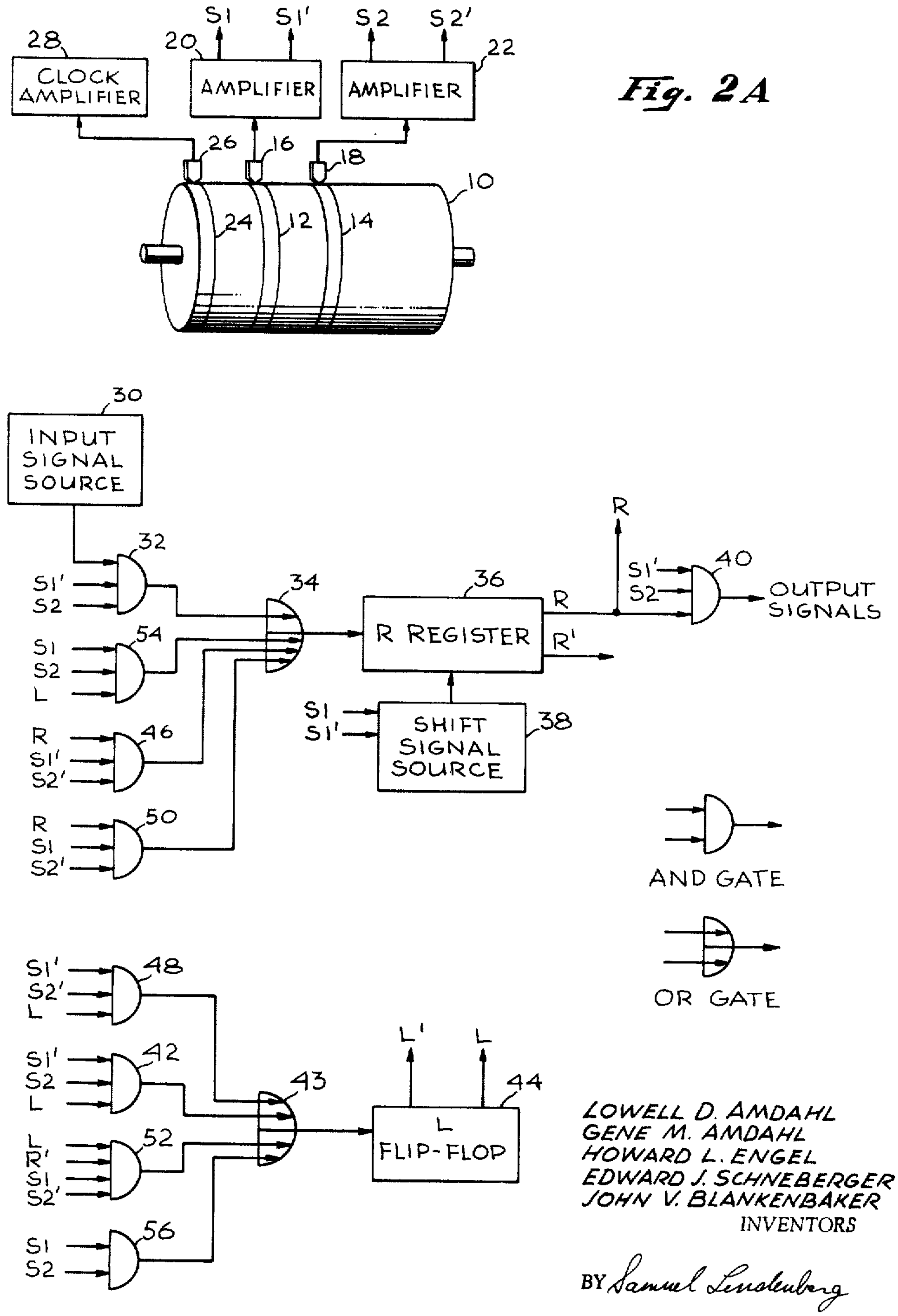
FIGURES 2A through 2D are more detailed block schematic diagrams illustrating several variations in accordance with this invention of the embodiment of the invention of FIGURE 1 which emloys a single flip-flop circuit.

FIGURE 2A represents a block diagram of a computer which will operate in accordance with the functions specified in Table I and which is an embodiment of the invention of the type represented by the block diagram of FIGURE 2. In accordance with this invention, there is required a source of stored logic signals. Such a source may be any well-known memory system and is exemplified in FIGURE 2A by a magnetic drum 10 which has at least two tracks therein respectively 12 and 14. The sets of logical signals for operating the computer are stored in these two tracks. It should be noted at this point that although Table I shows stored logic code (0), (1), (2), (3), this should not be taken to mean that the stored logic codes occur in this sequence. They may occur in any sequence, and the same set of stored logic signals may be repeated any number of times. Table I merely shows the operation which may be expected from the single register and flip-flop circuit in response to four sets of stored logic code. Unless otherwise specified, the flip-flop circuit represented by a rectangle in the drawings herein is of the type known as a delay flip-flop. Its output is determined by its input. Its output occurs one digit time after its input is applied and remains for one digit time when in the absence of a new input it is reset to its zero representative condition. Further, this flip-flop may include if desired, provision for also providing as an additional output the complement of the output which it produces in response to input signals. These delay flip-flops are well known in the computer art.

Thus, referring back to FIGURE 2A, the stored logic code signals are read from the tracks 12, 14 by the reading heads respectively 16, 18, the outputs from which are applied to the two amplifiers 20, 22, respectively. The amplifiers 20, 22 each will provide one or the other outputs as illustrated. Thus, amplifier 20 will provide as an output the signal S1 or a signal S1' simultaneously with the output from amplifier 22 of the signal S2 or a signal S2'. The drum 10 is shown as being provided with the usual clock track 24, clock reading head 26 and clock amplifier 28 for the sake of completeness and utility in recording and/or reproduction if desired.

In order to minimize the possibility of confusion, in the drawings the gating apparatus to which the stored logic signals are applied will have lines connected thereto with a designation of the stored logic signal, instead of showing wiring connecting the stored logic signal source to all of this apparatus. Referring back to FIGURE 2A, the source of signals to be processed by the computer is designated as an input signal source 30. Its output is applied to an "and" gate 32. Two other inputs applied to the "and" gate 32 are the logic signals S1′, S2. The output of the "and" gate 32 is applied to an "or" gate 34. The output of the "or" gate 34 is applied to the R register 36. The register 36 is actuated by signals from a shift signal source 38 which operates any time one of the stored logic signals S1 or S1′ appears.

Referring to Table I, it will be seen that the stored logic signals S1′, S2 specify "toR=input signals." In accordance with the circuit just described, "and" gate 32 is enabled to pass signals from the input signal source 30 in the presence of S1′, S2 and these signals can then pass through the "or" gate 34 into the R register 36. Thus, the structure for carrying out this portion of the command is shown. The (1) command also orders "output=R" and "toL=L." The output of the register 36 is applied to an "and" gate 40. Two other required inputs to permit the "and" gate 40 to pass the output of the register R are the S1′, S2 logic signals.

The toL=L function specified by the (1) stored logic command is interpretable as either a "do-nothing command" or a "circulate command." This function is carried out by means of an "and" gate 42 to the input of which there is applied the output L of the delay flip-flop 44, as well as the stored logic signals S1′, S2. The functions specified by a (0) command call for the register R to recirculate and the flip-flop L to recirculate. The two function is carried out for the R register by an "and" gate 46 having as its input the output of the R register R and the stored logic signals S1′ and S2′. The "and" gate 46 is connected to the "or" gate 34 the output of which is connected to the input of the register 36. The circulate function is carried out for the L flip-flop by an "and" gate 48 which has as its input the output of the L flip-flop and the stored logic signals S1′, S2′.

Stored logic command (2) calls for the function toR=R which is a circulate function and toL=L.R′ which is a complementing function. The circulate function is carried out by an "and" gate 50 having as its required inputs the output of the R register R and the stored logic signals S1, S2′. The output of "and" gate 50 is applied through "and" gate 34 to the R register 36. The function of complementing which involves the L flip-flop is effectuated by an "and" gate 52 which produce an output to drive the L flip-flop when the input thereto is L, R′, and the stored logic signals S1 and S2′. The R register 36 is of the well known type which produces as an output both a digit R and its complement R′.

The command (3) enters the contents of the L flip-flop into the R register. This is achieved by employing an "and" gate 54 which passes an L signal, the L output of the L flip-flop, when the stored logic signals S1 and S2 are also applied to its input. The output of the "and" gate 54 is connected to the input to the R register 36 through the "or" gate 34. The function toL=1 is effectuated employing an "and" gate 56 having as its gating inputs the stored logic signals S1, S2. The "and" gate output is applied to drive the L flip-flop into its one state through the "or" gate 43.

In summary therefore, as indicated in Table I, stored logic code (0) is identified by the code set 00 specifying a function where register R receives its output signal R without change and flip-flop L receives its output signal without change. It will be understood, of course, that actually no logical operation need be performed where a proper storage element is employed in this case since the information in the element need merely be retained. That is, no change in state need be effected. Code (0) therefore may be considered to be a no-change or do-nothing code and may not be shown in the tables which follow where the stored logic sequence is illustrated.

Stored logic code (1) defines the logical input and output digits for the computer. In this case register R receives the input digit and the output signal R of the register is conveyed through an "and" circuit 22 shown in FIG. 2 to produce computer output signals.

Stored logic code (2) defines the logical product of signal L and the complement of signal R (represented as R′). Signal R is not modified, or in other words, is simply recirculated.

Logical code (3) defines a storage function where the binary digit in flip-flop L is transferred to register R and flip-flop L is set to a binary 1 state. This logical operation prepares flip-flop L to receive the complement of variables stored in register R by means of the logical product defined by stored logic code (2).

The logic for the control networks for the L flip-flop and R register may now be readily defined from the information shown in the diagram of Table II below:

TABLE II

| toL | | | | | | | toR | | | | | | |
|---|---|---|---|---|---|---|---|---|---|---|---|---|---|
| | S1 | S2 | | | | | | S1 | S2 | | | | |
| (0) | 0 | 0 | 0 | 0 | 1 | 1 | (0) | 0 | 0 | 0 | 1 | 0 | 1 |
| (1) | 0 | 1 | 0 | 0 | 1 | 1 | (1) | 0 | 1 | 1 | 1 | 1 | 1 |
| (2) | 1 | 0 | 0 | 0 | 1 | 0 | (2) | 1 | 0 | 0 | 1 | 0 | 1 |
| (3) | 1 | 1 | 1 | 1 | 1 | 1 | (3) | 1 | 1 | 0 | 0 | 1 | 1 |
| | | L | 0 | 0 | 1 | 1 | | | L | 0 | 0 | 1 | 1 |
| | | R | 0 | 1 | 0 | 1 | | | R | 0 | 1 | 0 | 1 |

An explanation of Table II is as follows: Under the heading toL there is shown the stored logic signals under columns S1 and S2 and adjacent the stored logic signals are numerals 0 and 1 representing the binary input to the L flip-flop which is applied in the presence of the stored logic commands designated and the states of the L flip-flop and the R register output represented by the binary numerals adjacent L and R under the column headed S2. Thus, the input to L in the presence of the complement command (2) when the L flip-flop is in its binary zero state, and when the R register output is a binary one, is zero. This may be seen by looking at the (2) row and the L and R column in which the symbols 0 and 1 appear. The input to L upon the occurrence of a circulate command (0) depends upon the state of the L flip-flop and occurs regardless of the output from the R register. Thus, in the (0) row, the binary numbers are identical to those shown adjacent the L row.

From the explanation just given for the "toL" portion of the Table II, the "toR" portion of Table II should be understandable. The "input-output" command (1) calls for an input to the R register. This is represented by the 1's in the column adjacent the (1) row. The input to R in the presence of the store command (3) is whatever the condition of the L register happens to be when that command is issued. Thus, the row adjacent command (3) resembles the states of the L flip-flop.

It will be noted in Table II that flip-flop L is held in the binary 1 state whenever it is presently in the 1 state and the output signal R is 0. This is represented by the logical condition L.R'=1. It will also be noted that flip-flop L is always set to a binary 1 state for logical code (3), which is identified by the condition S1.S2=1. Finally, the flip-flop L is retained in a binary 1 state for the logical code condition S1=0, or S1'=1. This set of logical conditions may be expressed as follows:

$$toL=L.R'+S1.S2+S1'.L \qquad (A)$$

If it is assumed that a flip-flop having 1-setting and 0-setting input circuits is available, the same function may be expressed as follows:

$$1L=S1.S2$$
$$0L=S1.S2'.R$$

The flip-flop functions may also be verified from Table II where it will be noted that the signal L changes from a 0 state to a 1 state only for the condition S1.S2=1, and that signal L changes from a 1 state to a 0 state only for the condition S1.S2'.R'=1.

In a similar manner, the logical function for register R may be derived from Table II as follows:

$$toR=S2'.R+I.S1'.S2+L.S1.S2 \qquad (B)$$

Figure 2B:
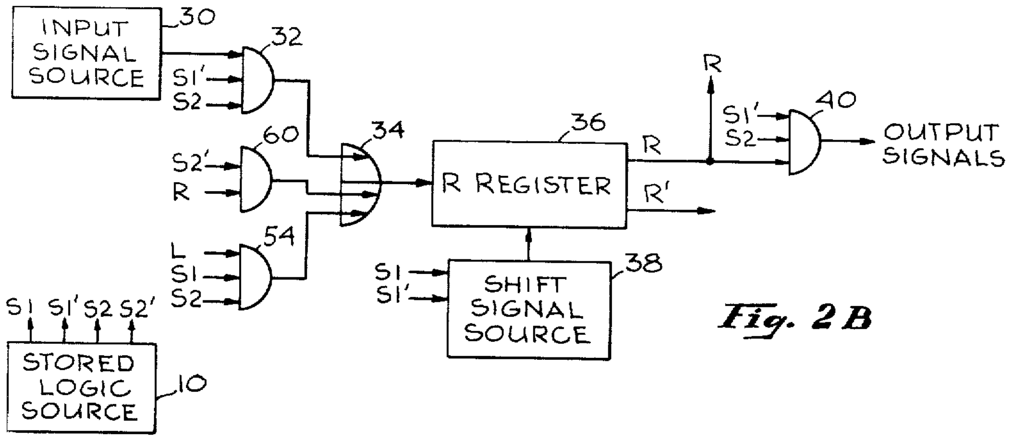

The logical Equations A and B actually define the inputs toL and toR which arrive upon the occurrence of each one of the stored logic commands giving due consideration to the preceding conditions of the L flip-flop and the R register output stage. Thus, the block schemater diagram of FIGURE 2A can be redrawn and is shown as FIGURE 2B. FIGURE 2B is simpler than FIGURE 2A and yet can do anything that can be accomplished by the structures represented in FIGURE 2A. Those structures in FIGURE 2B which are identical with structures in FIGURE 2A and perform the same functions are given the same reference numeral. Considering the input to the R register 36 which is represented by the logical Equation B it is seen that an input to the R register occurs with the logic signal S2' and R, with R representing a "0" or a "1" signal as determined by the state of the last stage of the shift register. "And" gate 60 has as its input S2' and R and applies its output to the "or" gate 34, the output of which in turn is connected to the input to the R register. Another input to the R register occurs in the presence of an input signal and the logical signals S1' and S2. This function is performed by the "and" gate 32 previously described. Still another input to the R register is provided upon the simultaneous occurrence of the S1 and S2 logic signals which gate into the R register the state of the L register. The "and" gate 54 performs this function in the same fashion as was described previously in connection with FIGURE 2A.

The inputs to L are considerably simplified. These are in accordance with logical Equation A. Signals LR' are applied to the "and" gate 62 the output of which drives the L flip-flop through "or" gate 43. S1 and S2 signals are applied to an "and" gate 64, and S1'L signals are applied to an "and" gate 66. The outputs of these two "and" gates respectively 64, 66 also are applied to the "or" gate 43, the output of which is used to drive the L flip-flop 44.

With the simple set of logic given above as derived from Table II, it is possible to solve even the most complex computer function. As an illustration of this capability, a counting problem will be solved. That is the computer will be made to perform the operations which a counter performs. It will generate the functions which must be generated to operate a counter. In this problem it will be assumed that a waveform has high and low levels represented by the binary 1 and 0 states of an input signal G; that is, when G=1 the waveform is in its high level state and when G is equal to 0 the waveform is in its low level state. The binary variable G then will be the input signal for our computer. In addition, a binary variable H will be defined as equal to G with provision being made for storing H to indicate that the particular signal G has already been counted. This will avoid a double counting problem.

The computer will be made to produce an output signal for each eighth occurrence of the high level state of the waveform as indicated by input variable G. In other words, the computer will serve the function of a counter having a cycle of 8.

A counter including flip-flops A, B, and C may be made to count to 8 in accordance with the following logic:

$$toA=A'.B.C.G.H'+A.B'.G.H'+A.C'.G.H'+A.G'+A.H \qquad (E)$$
$$toB=B.C'.G.H'+B'.C.G.H'+B.G'.+B.H \qquad (F)$$
$$toC=C'.G.H'+C.G'+C.H \qquad (G)$$

The variables H and H' are introduced as pointed out above to prevent a double count. Each time signal G is sensed it is entered into the H variable position to indicate that a count is being made.

Output each eighth count=A.B.C.G.H'

The logic has been expanded here so as to facilitate the explanation referring to Table IV which follows. This logic is designed to cause the conventional binary sequencing of flip-flops A, B and C, as indicated in Table III as follows:

TABLE III

| | A | B | C |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

An explanation of the logical Equations E, F and G representing the signals required for advancing a counter consisting of the three flip-flops A, B, and C in response to input variable G is as follows: It will be assumed that each one of the flip-flops A, B and C only maintains the state to which it is driven by an ipnut for one digit time. If a succeeding signal for maintaining it in the 1 state does not occur upon the termination of a digit time it resets to the 0 state. Now observing Table III, it will be seen that the A flip-flop receives an input when a counter consisting of the flip-flops A, B and C is driven from its fourth to its fifth count representative position. After receiving such input it is maintained in its 1 state until the counter is filled. Thus, the A flip-flop receives an input when the counter is in its fourth count representative state. This requires the A flip-flop to be in its 0 representative state designated as A', the B and C flip-flops are in their 1 representative states designated as B and C. A G input signal must be applied which, of course, requires an H' associated signal. Therefore, the first input to A occurs when signals A'.B.C.G.H' are present.

Once the A flip-flop is set or according to the Table III it must be maintained there until in its 1 state, the counter fills. In the absence of a G input signal A.G' signals perform this function. In the presence of an H signal A.H signals perform this function. A.B'.G.H' signals insure an input to A in going from count 5 to count 6 and from count 6 to count 7. A.C'.G.H signals insure an input to A in going from count 7 to count 8.

The explanation of the functions toB and toC should become obvious from the above. Thus, the C flip-flop will receive an input to be driven to its 1 state upon the occurrence of the G.H' signal only when the C flip-flop is in its zero representative or C' state. The remaining terms, C.G′ and C.H′ insure that the C flip-flop stays in its 1 state until the occurrence of the next G.H′ signals.

The sequence of producing stored logic code sets to perform the above indicated counting function using the structure shown in any one of FIGURES 2, 2A or 2B is indicated in Table IV. Table IV as will be explained in more detail represents the stored logic signals which are stored in the stored logic source.

L the function L.R′. As may be deduced from the "toR" section of Table II, this is the complementing function. The stored logic instruction (3) referring back to Tables I and II enter into the R register the digit stored in L and transfers the L flip-flop to its 1 state. Thus, as a result of the completion of the second minor cycle, the variables A.A′ through H.H′ are stored in the register R at the locations shown.

TABLE IV

| Minor Cycle | | 1<br>A | 2<br>A′ | 3<br>B | 4<br>B′ | 5<br>C | 6<br>C′ | 7<br>G | 8<br>G′ | 9<br>H | 10<br>H′ | 11 | 12<br>Working | 13 | 14 | 15 | 16 | Variable Position<br>Variable |
|---|---|---|---|---|---|---|---|---|---|---|---|---|---|---|---|---|---|---|
| I | 1 | – | – | – | – | – | – | 1 | – | – | – | – | – | – | – | – | – | Input/output |
| | 2 | 2 | 3 | 2 | 3 | 2 | 3 | 2 | 3 | 2 | 3 | – | – | – | – | – | – | Complements |
| | 3 | 2 | – | – | 2 | – | 2 | – | 2 | 2 | – | 3 | – | – | – | – | – | A′.B.C.G.H′ |
| | 4 | – | 2 | 2 | – | – | – | – | 2 | 2 | – | – | 3 | – | – | – | – | A.B′.G.H′ |
| | 5 | – | 2 | – | – | 2 | – | – | 2 | 2 | – | – | – | 3 | – | – | – | A.C′.G.H′ |
| | 6 | – | 2 | – | – | – | – | 2 | – | – | – | – | – | – | 3 | – | – | A.G′ |
| | 7 | – | 2 | – | – | – | – | – | – | – | 2 | – | – | – | – | 3 | – | A.H |
| | 8 | – | – | – | – | – | – | – | – | – | – | 2 | 2 | 2 | 2 | 2 | 3 | (toA)′ |
| II | 9 | – | – | – | 2 | 2 | – | – | 2 | 2 | – | 3 | – | – | – | – | – | B.C′.G.H′ |
| | 10 | – | – | 2 | – | – | 2 | – | 2 | 2 | – | – | 3 | – | – | – | – | B.′C.G.H′ |
| | 11 | – | – | – | 2 | – | – | 2 | – | – | – | – | – | 3 | – | – | – | B.G′ |
| | 12 | – | – | – | 2 | – | – | – | – | 2 | 2 | – | – | – | 3 | – | – | B.H |
| | 13 | – | – | – | – | – | – | – | – | – | – | 2 | 2 | 2 | 2 | 3 | – | (toB)′ |
| III | 14 | – | – | – | – | 2 | – | – | 2 | 2 | – | 3 | – | – | – | – | – | C′.G.H′ |
| | 15 | – | – | – | – | – | 2 | 2 | – | – | – | – | 3 | – | – | – | – | C.G′ |
| | 16 | – | – | – | – | – | 2 | – | – | – | 2 | – | – | 3 | – | – | – | C.H |
| | 17 | – | – | – | – | – | – | – | – | – | – | 2 | 2 | 2 | 3 | – | – | (toC)′ |
| | 18 | – | – | – | – | – | – | 2 | – | – | – | – | – | 3 | – | – | – | (toH)′ |
| | 19 | – | 2 | – | 2 | – | 2 | – | 2 | 2 | – | – | – | – | – | – | – | A.B.C.G.H′ |
| | 20 | – | – | – | – | – | – | 3 | – | – | – | – | – | 2 | – | – | – | |
| IV | 21 | – | – | – | – | – | – | – | – | 3 | – | – | – | – | 2 | – | – | toH |
| | 22 | – | – | – | – | 3 | – | – | – | – | – | – | – | – | – | 2 | – | toC |
| | 23 | – | – | 3 | – | – | – | – | – | – | – | – | – | – | – | – | 2 | toB |
| | 24 | 3 | – | – | – | – | – | – | – | – | – | – | – | – | – | – | – | toA |

Other counting functions are possible, for example:
toA=A′.B.C.G.H′+A.(B′+C′+G′+H)
toB=B′.C.G.H′+B.(C′+G′+H)
toC=C′.G.H′+C.(G′+H).

In Table IV it will be noted that 3 groups of counting cycles identified as Groups I, II and III are utilized to compute the functions (toA)′, (toB)′ and (toC)′, corresponding respectively to the complements of the input functions for flip-flops A, B and C as defined previously. The sequence of stored logic codes required to generate the respective functions is indicated in the corresponding rows. The numbers 1, 2 and 3 are employed to represent the respective stored logic codes. The (–) is used in place of the (0) stored logic instruction to aid in the identification of the rows. The sequence of the operation should now be apparent. The read out of the stored logic instructions is performed as specified by a row sequence proceeding from left to right along each row in turn. It will be assumed that in this computer the storage register can store a minimum of 16 bits.

It will be assumed that the functions A, B, C and H have been previously entered into the register and are stored in the bit positions as shown by the numbers 1 through 10. Referring to Table IV, it is indicated that in the cycle Group I minor cycle 1 a stored logic (1) command occurs. This enables the sensing of the G function from an outside source and the entry thereof to the storage register. For the sake of convenience and simplicity of the consideration herein, the G function will be considered as entered into position 7 in the shift register R, the selection of this position being made arbitrarily in order to arrange all of the variables in proper alphabetical order. It will be appreciated that a circulation of the contents of the shift register to enable the entry of the G signal into the 7 position is very easily effectuated.

During minor cycle 2 in Group I, the complements of all variables are obtained by alternating stored logic codes 2 and 3 in sequence. Referring back to Table I, it will be seen that the code (2) calls for the R register to circulate its output into its input and also inputs to It is desired during minor cycle 3 of Group I to generate the functions A′.B.C.G.H′ as shown on the extreme right-hand side of the row and to store this function in position 11 of the shift register. The first stored logic order given during minor cycle 3 is order (2) since the last order during minor cycle 2 left the L flip-flop in its 1 state, the entry of L.R′ (here R′=A′), (where L is 1 and A′ is 0) results in the L flip-flop generating and storing the complement of A or A′ (0, see Table II). Thus, at the conclusion of the first operation during minor cycle 3, the flip-flop L is storing A′.

The following two instructions during the minor cycle are the (0) instructions or circulate. Then a (2) command is provided. This calls for the entry into the L flip-flop of the function L.R′. (Here R′ is B and L is A′.) Thus, the L flip-flop will at the termination of the execution of this command be storing A′.B.

The next instruction during minor cycle 3 is a circulate instruction. This is followed by another stored logic command (2). L.R′ which is entered into the L flip-flop to be stored this time comprises A′ and B.C. It will be appreciated from the preceding description that the (0) stored logic instruction is employed to bring a function in the shift register to the position from which it can be read out of the register and operated upon. The (2) stored logic instruction then orders the R register to circulate one digit and to apply the complement of the circulated digit to the "and" gate (62 in FIGURE 2B, for example). This digit is "anded" with the L flip-flop output and the output of the "and" gate is entered into the L flip-flop.

At the completion of the tenth operation during minor cycle 3, the function A′.B.C.G.H′ has been computed and is stored in the L flip-flop. The next stored logic instruction is the (3) instruction. This serves to read out the function from the L flip-flop into the eleventh position of the shift register which has been made available for such entry at this time, and sets the L flip-flop into its 1 stable state.

From the description which has been given, it should be appreciated how during the fourth minor cycle of Group I the function A.B′.G.H′ is generated and then stored in the twelfth position of shift register. During the fifth minor cycle the function A.C′.G.H′ is generated and stored in the thirteenth working position. During the sixth minor cycle the function A.G′ is generated and stored in the fourteenth working position of the register R. During the seventh minor cycle the function A.H is generated and stored in the fifteenth position of the R register.

During minor cycle 8 the contents of the eleventh through fifteenth storage positions in the shift register R are "anded" together and complemented by using the stored logic (2) command, and then are stored in the sixteenth position. That is, the function stored in the sixteenth position is the complement of the function (toA) which is shown as (toA)′. That is, $$(toA)'=(A'.B.C.G.H')'.(A.B'.G.H')'.(A.C'.G.H')'.(A.G')'.(A.H)'$$

This is stored in variable position sixteen. How this is effectuated may be readily shown as follows: At the termination of the seventh minor cycle, the (3) stored logic command leaves the L flip-flop in its 1 state. During the eighth minor cycle, the (2) stored logic command occurring when the eleventh position of the shift register is available results in the entry into the L flip-flop of L.R′ which in this instance constitutes (A′.B.C.G.H′)′. This then constitutes the contents of the L flip-flop. The succeeding stored logic commands then "and" with this function the "primes" of the functions stored in positions twelve, thirteen, fourteen and fifteen of the register resulting in the function (toA)′ as indicated previously which is stored in the sixteenth position of the R register.

From the description which has been given, it should be apparent how the functions (toB)′ and (toC)′ are generated and respectively stored in the fourteenth and fifteenth storage positions of the R register.

During the eighteenth minor cycle, the complement of G is entered into the L flip-flop. The complement of G is equivalent to (toA)′.(toH) is then entered into the thirteenth position of the R register. During the nineteenth minor cycle, the function (A.B.C.G.H′) is generated and stored in the position 7 of the register R on the twentieth minor cycle replacing the G function. This signal will then be read from the R register as an output signal at the same time an input signal is to be entered into the register. It will be recalled that this output function A.B.C.G.H′ is indicative of a full count. During the twentieth cycle, also the function (toA)′ which is stored in the thirteenth position of the shift register is entered as a complement into the flip-flop L.

After producing the output signal A.B.C.G.H′, the remaining minor cycles 21 through 24 of Group IV are employed to generate the new variable signals. These are obtained by picking up the variables from the working positions in which they have been stored and transferring them to the corresponding variable positions. Thus, during minor cycle 21, the variable (toH) is entered into position 9 as the H variable by the (3) stored logic command. At that time the variable (toC)′ which was stored in the fourteenth working position is complemented and entered into the flip-flop L. During the minor cycle 22, the C variable is entered into the fifth storage position of the register. During the twenty-third and twenty-fourth minor cycles the B and A variables are entered into their respective third and first storage positions in the register R.

In summary therefore by first storing the logic instructions shown in the sequence represented by Table IV, with a few simple components such as the shift register, the flip-flop, and the "and" gates and "or" gates, a very complicated operation can be performed which in the case of other computers would involve considerably greater and more complicated structural combinations. It should be understood that although the exemplification of the embodiment of the invention is described wherein each one of the functions A, B, C, etc. is a single binary bit, this is done to simplify and clarify the explanation. It will be apparent that more complicated word structures may be employed in place of the single binary bit functions with an increase in capacity of the structures or by multiplying the structure shown and operating them in parallel.

The above computing logic and cycle definition in Table IV were based upon the use of the "and" function L.R′. A very similar approach may be defined by the use of a complementing "or" function L+R′ as defined in Tables I*a* and II*a* below.

TABLE I*a*

| | S1 | S2 | |
|---|---|---|---|
| (0) | 0 | 0 | toR=R; toL=L |
| (1) | 0 | 1 | toR=input signals; output=R; toL=L |
| (2) | 1 | 0 | toR=R; toL=L+R′ |
| (3) | 1 | 1 | toR=L; toL=0 |

TABLE II*a*

| toL | | | | | | | toR | | | | | | |
|---|---|---|---|---|---|---|---|---|---|---|---|---|---|
| | S1 | S2 | | | | | | S1 | S2 | | | | |
| (0) | 0 | 0 | 0 | 0 | 1 | 1 | (0) | 0 | 0 | 0 | 1 | 0 | 1 |
| (1) | 0 | 1 | 0 | 0 | 1 | 1 | (1) | 0 | 1 | 1 | 1 | 1 | 1 |
| (2) | 1 | 0 | 1 | 0 | 1 | 1 | (2) | 1 | 0 | 0 | 1 | 0 | 1 |
| (3) | 1 | 1 | 0 | 0 | 0 | 0 | (3) | 1 | 1 | 0 | 0 | 1 | 1 |
| | | L | 0 | 0 | 1 | 1 | | | L | 0 | 0 | 1 | 1 |
| | | R | 0 | 1 | 0 | 1 | | | R | 0 | 1 | 0 | 1 |

The function toR is defined the same as above since Tables II*a* and II are identical in this respect.

The new function toL is defined as follows:

$$toL=L.(S1'+S2')+S1.S2'.R \qquad (H)$$

This function may also be written as:

$$1L=S1.S2'.R'$$
$$0L=S1.S2$$

Figure 2C:
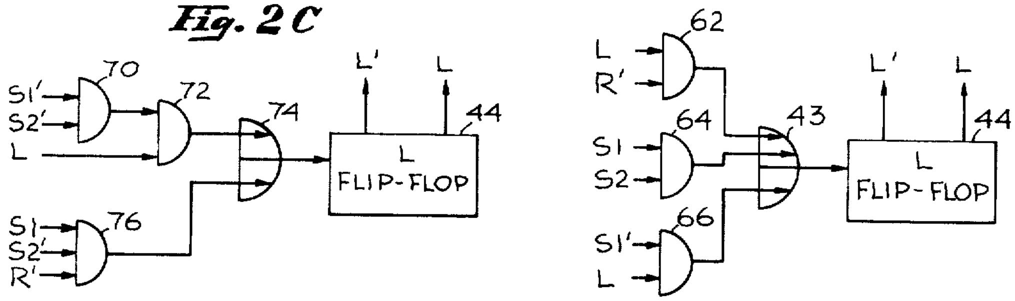

By inspection, it will be seen that the sole changes in the structural arrangements of the computer effectively constitute the input to the L flip-flop as set forth by logical Equation H. Accordingly, these changes are shown in FIGURE 2C of the drawings. The remaining structure as represented by FIGURE 2A or 2B aside from the L flip-flop and its associated input gates is to be considered as identical. In FIGURE 2C the state of the L flip-flop is inserted back into the L flip-flop (circulate) upon the occurrence of either an S1′ or S2′ logical command signal. (Logical commands (0), (1) and (2).) This is accomplished by an "or" gate 70 to the input of which is applied either S1′ or S2′ signals. The output of the "or" gate 70 is an input to a two input "and" gate 72. The other input to the "and" gate is the output of the L register. The output of the "and" gate 72 is applied to an "or" gate 74, the output of which is employed to drive the L register. The other term in the logical Equation H represents the input to the L flip-flop of the complemented output of the R register when the stored logic command (2) is received. This is accomplished by an "and" gate 76 which has as its gating input the signals S1 and S2', and the complemented output of the R register, R'. The output of the "and" gate 76 is applied to the "or" gate 74 for driving the flip-flop 44.

The counting problem defined above in Table III may be sequenced according to the new logic derived from Table II*a* according to Table IV*a* below.

TABLE IV*a*

| Minor Cycle | 1<br>A | 2<br>A' | 3<br>B | 4<br>B' | 5<br>C | 6<br>C' | 7<br>G | 8<br>G' | 9<br>H | 10<br>H' | 11<br>Working | 12<br>Working | 13<br>Working | 14<br>Working | 15<br>Working | 16<br>Working | Variable Position<br>Variable |
|---|---|---|---|---|---|---|---|---|---|---|---|---|---|---|---|---|---|
| I 1 | – | – | – | – | – | – | 1 | – | – | – | – | – | – | – | – | – | Input/output |
| I 2 | 2 | 3 | 2 | 3 | 2 | 3 | 2 | 3 | 2 | 3 | – | – | – | – | – | – | Complements |
| I 3 | – | 2 | 2 | – | 2 | – | 2 | – | – | 2 | 3 | – | – | – | – | – | A+B'+C'+G'+H |
| I 4 | 2 | – | – | 2 | – | – | 2 | – | – | 2 | – | 3 | – | – | – | – | A'+B+G'+H |
| I 5 | 2 | – | – | – | – | 2 | 2 | – | – | 2 | – | – | 3 | – | – | – | A'+C+G'+H |
| I 6 | 2 | – | – | – | – | – | – | 2 | – | – | – | – | – | 3 | – | – | A'+G |
| I 7 | 2 | – | – | – | – | – | – | – | 2 | – | – | – | – | – | 3 | – | A'+H' |
| I 8 | – | – | – | – | – | – | – | – | – | – | 2 | 2 | 2 | 2 | 2 | – | toA |
| I 9 | 3 | – | – | – | – | – | – | – | – | – | – | – | – | – | – | – | |
| II 10 | – | – | 2 | – | – | 2 | 2 | – | – | 2 | 3 | – | – | – | – | – | B'+C+G'+H |
| II 11 | – | – | – | 2 | 2 | – | 2 | – | – | 2 | – | 3 | – | – | – | – | B+C'+G'+H |
| II 12 | – | – | 2 | – | – | – | – | 2 | – | – | – | – | 3 | – | – | – | B'+G |
| II 13 | – | – | 2 | – | – | – | – | – | 2 | – | – | – | – | 3 | – | – | B'+H' |
| II 14 | – | – | – | – | – | – | – | – | – | – | 2 | 2 | 2 | 2 | – | – | toB |
| II 15 | – | – | 3 | – | – | – | – | – | – | – | – | – | – | – | – | – | |
| III 16 | – | – | – | – | – | 2 | 2 | – | – | 2 | 3 | – | – | – | – | – | C+G'+H |
| III 17 | – | – | – | – | 2 | – | – | 2 | – | – | – | 3 | – | – | – | – | C'+G |
| III 18 | – | – | – | – | 2 | – | – | – | 2 | – | – | – | 3 | – | – | – | C'+H' |
| III 19 | – | – | – | – | – | – | – | – | – | – | 2 | 2 | 2 | – | – | – | toC |
| III 20 | – | – | – | – | 3 | – | – | – | – | – | – | – | – | – | – | – | |
| 21 | – | – | – | – | – | – | – | 2 | 3 | – | – | – | – | – | – | – | toH |
| 22 | 2 | – | 2 | – | 2 | – | 2 | – | – | 2 | – | – | – | – | – | – | A'+B'+C'+G'+H |
| 23 | – | – | – | – | – | – | 3 | – | – | – | – | – | – | – | – | – | Output |

The operation of the computer in accordance with the stored logic defined in Table IV*a* should be apparent from the description of the operation of the computer in response to the stored logic shown in Table IV.

A further variation in logic using a single flip-flop in the manner indicated above is illustrated in Table I*b* and II*b* below, the applicable logic being shown below.

TABLE I*b*

| | S1 | S2 | |
|---|---|---|---|
| (0) | 0 | 0 | toR=R; toL=L |
| (1) | 0 | 1 | toR=input signal; output=R; toL=L |
| (2) | 1 | 0 | toR=R; toL=L+R |
| (3) | 1 | 1 | toR=L'; toL=0 |

TABLE II*b*

| toL | | | | | | | toR | | | | | | |
|---|---|---|---|---|---|---|---|---|---|---|---|---|---|
| | S1 | S2 | | | | | | S1 | S2 | | | | |
| (0) | 0 | 0 | 0 | 0 | 1 | 1 | (0) | 0 | 0 | 0 | 1 | 0 | 1 |
| (1) | 0 | 1 | 0 | 0 | 1 | 1 | (1) | 0 | 1 | 1 | 1 | 1 | 1 |
| (2) | 1 | 0 | 0 | 1 | 1 | 1 | (2) | 1 | 0 | 0 | 1 | 0 | 1 |
| (3) | 1 | 1 | 0 | 0 | 0 | 0 | (3) | 1 | 1 | 1 | 1 | 0 | 0 |
| | | L | 0 | 0 | 1 | 1 | | | L | 0 | 0 | 1 | 1 |
| | | R | 0 | 1 | 0 | 1 | | | R | 0 | 1 | 0 | 1 |

$$toL=L.S1'+L.S2'+R.S1.S2' \quad (J)$$

$$toR=S1'.S2.I+R.S2'+L'.S1.S2 \quad (K)$$

The complement function is here carried out in response to the stored logic code (3) in view of the entry into the R register of L' or the complement of the data stored in the L flip-flop. Further the 0 in "toL=0" means that the L flip-flop is allowed to go to its 0 representative state instead of being driven to its 1 representative state as was described previously. The complement of the output of the L flip-flop can be obtained in any number of known ways such as constructing the flip-flop to automatically produce it, or have another flip-flop associated therewith and driven in parallel in a manner to provide an output representing a 1 when the L flip-flop output represents a 0, and vice versa. Alternative to this the output of the L flip-flop may be applied to an inverter which performs the complementing function.

Figure 2D:
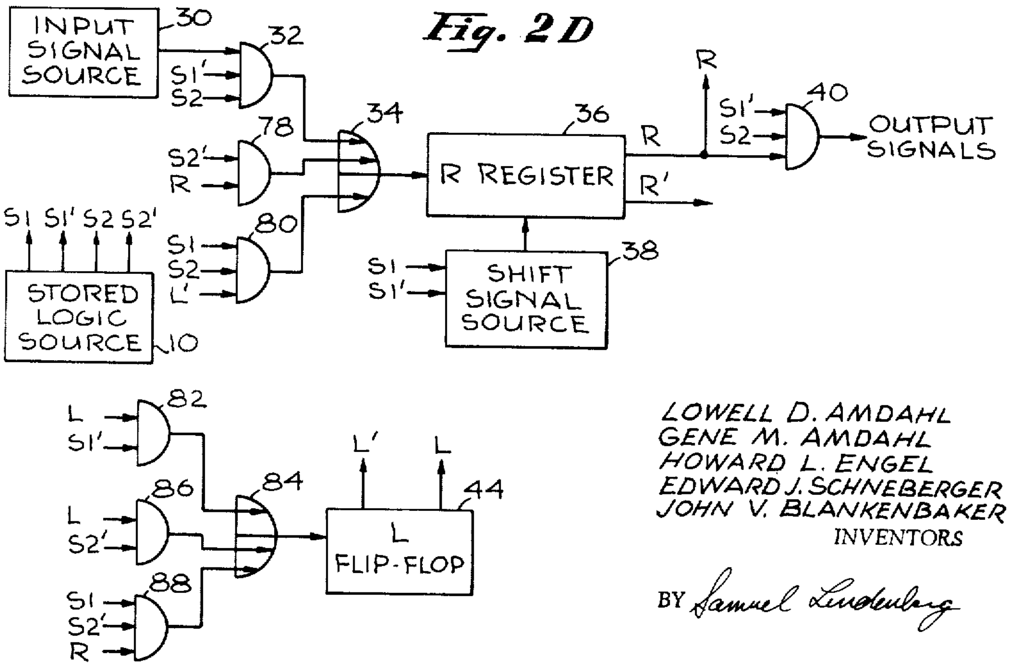

FIGURE 2D represents a computer responsive to the stored logic code in accordance with this invention, which code is shown in Table I*b* which is simplified and expressed as a pair of logical Equations J and K. Thus, the input signal source 30 is enabled to enter its output into the R register 36 upon the occurrence of the stored logic signals S1', S2 all of which are applied to the "and" gate 32. The output of the "and" gate 32 is applied to the "or" gate 34 which has its output connected to the input stage of the R register 36. Simultaneously with the input of the signals from the source 30 to the R register 36 an output occurs from the R register. This is achieved by "and" gate 40 to which the R register signals are applied together with the S1' and S2 logical function signal.

Each time the logical function signal S2' appears the R register circulates. This is indicated by the function R.S2'. The output of the R register and the gating S2' logic signal are applied to an "and" gate 78 which has its output connected to the "or" gate 34. This circulate operation occurs when the (0), and the (2), logical command signals appear. An input to the R register occurs when the (3) command S1, S2 appears. At that time the complement of the L register signal is entered into the R register. This is performed by the "and" gate 80 to which there are applied the S1 and S2 gating signals and the L' signal. The output of "and" gate 80 is applied to the "or" gate 34.

In accordance with the logical Equation J there are 3 functions which provide inputs to L. The output of the L flip-flop and the S1' logic signal are applied to an "and" gate 82 the output of which is connected to an "or" gate 84. The output of the "or" gate 84 drives the L flip-flop. Upon the occurrence of an S2' signal the L flip-flop again has its state maintained. This is effectuated by the "and" gate 86 to the inputs of which there are applied the output of the L flip-flop and an S2' signal. The output of the R register is entered into the L flip-flop upon the occurrence of the logical signals (2) or S1., S2'. This is effectuated by "and" gate 88 having the 3 inputs S1, S2' and R and having its output connected to the "or" gate 84.

It will be noted in this case that the complementation function is included in the definition of stored logic code (3) and that the basic function employed is the "or" function without complementation.

Figure 3:
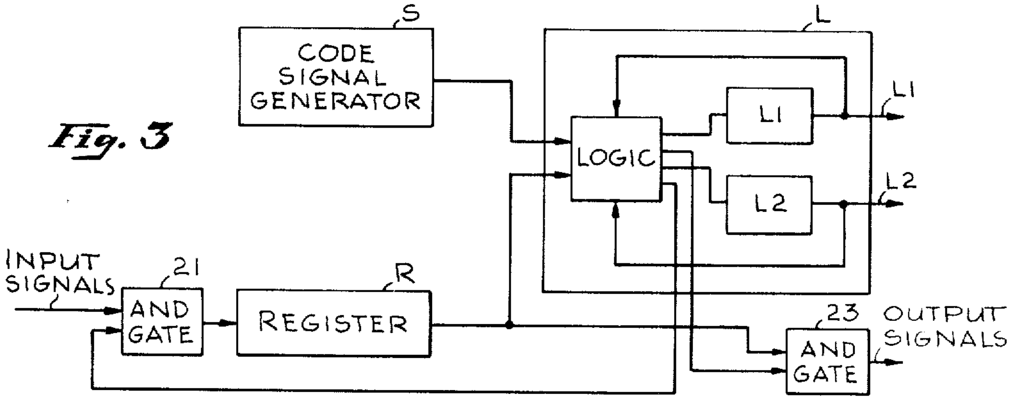
FIGURE 3 is a generalized block diagram of another arrangement of an embodiment of the invention employing two logical flip-flop circuits.

From the description thus far, it should be evident that the invention makes it possible to perform even the most complex computing function with but a single flip-flop and a minimum of logical circuits. It will now be shown that the basic concept of the invention may be extended to more complicated systems utilizing as an illustration, two and then four flip-flops in order to decrease the operating time required. As a first illustration, a two flip-flop computer system will be developed which is adapted to perform addition, including all input and output functions, during three minor cycle intervals. These minor cycles may correspond to the conventional word time intervals. The general form of such a computing system is shown in FIGURE 3 which will be noted to include a code signal generator S which produces signals S1 and S2; a logic network L including two flip-flops L1 and L2, the functions of which are defined below, and a register R for storing variables during an operation. As before, the input signals to register R are illustrated as being passed through an input circuit 21 and the output signals of register R are read through an output circuit 23. It will be understood, of course, that circuits 21 and 23 are shown only to illustrate the functioning of the circuit and may not actually be required as separate circuits. That is, these functions may be built in as part of the logic of network L.

One suitable definition for the two flip-flop system of FIGURE 3 is indicated in Tables V and VI below:

TABLE V

| | S1 | S2 | |
|---|---|---|---|
| (0) | 0 | 0 | toR=R; toL1=L1; toL2=L2 |
| (1) | 0 | 1 | toR=input signal; output=R; toL1=L1; toL2=L2 |
| (2) | 1 | 0 | toR=0; toL1=RL1'+R'L'; toL2=R.L1 |
| (3) | 1 | 1 | toR=RL1'+R'L1; toL1=R.L1+L2; toL2=L2 |

Figure 3A:
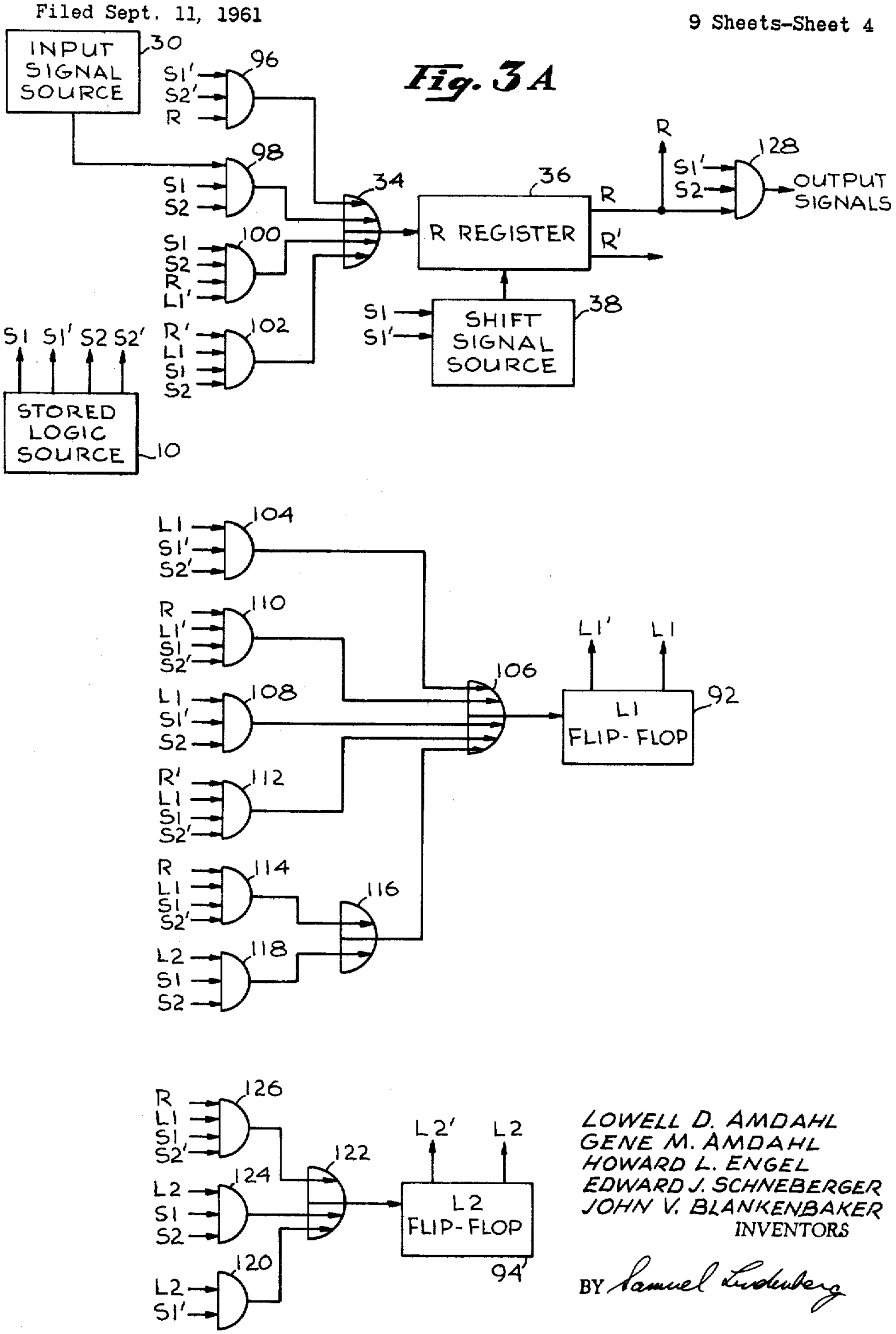
FIGURES 3A through 3C are more detailed block schematic diagrams illustrating the variations possible with a two flip-flop stored logic computer in accordance with this invention.

FIGURE 3A is a block schematic diagram of a two flip-flop embodiment of the invention which responds to the stored logic signals shown in Table V to provide the operations specified. Basically there is provided as in previous embodiments of the invention a stored logic source 10, a source of input signals 30 and R register 36 having in its input an "or" gate 34 and two flip-flop circuits respectively 92, 94 which will hereafter be designated as the L1 and L2 flip-flop circuits. The circuit arrangement for effectuating the operations called for in Table V should now be apparent to those skilled in the art. It will be noted that the R register 36 circulates its own output as an input upon the occurrence of the (0) command. "And" gate 96 has the S1' and S2' stored logic command signals applied to its input as gating signals as well as the output R of the R register 36. The output of "and" gate 96 is connected to the input of the "or" gate 34. Input to the R register is provided from an output signal source upon the occurrence of the S1' and S2 signals. To provide for this, "and" gate 98 has applied to its input S1' and S2 as gating signals as well as the output of the source of input signals 30. The output of the "and" gate 98 is connected to the "or" gate 34. A 0 is entered into the R register upon the occurrence of the (2) stored logic command. This is effectuated by shifting the register in response to an S1 signal without entering any input into the register. The shift signal source 38 shifts the R register upon the occurrence of an S1 signal. Finally there is another input to the R register upon the occurrence of the (3) stored logic command. This input is accomplished by the "and" gate 100 which has as its input S1, S2, R and L1'. The "and" gate 102 has as its input S1, S2, R', L1. The outputs of both "and" gates 100 and 102 are connected to the "or" gate 34.

Considering next the inputs to the L1 register, the L1 register circulates its contents upon the occurrence of the (0) and (1) stored logic command. Upon the occurrence of the (0) stored logic command, "and" gate 104 which has applied to its inputs S1', S2' and L1 can apply its output to an "or" gate 106 which drives the L1 flip-flop 92. Upon the occurrence of the (1) command, "and" gate 108 which has applied to its input S1', S2 and the output of the L1 flip-flop has its output applied to the "or" gate 106 for maintaining the state of the L1 register. In the presence of the (2) stored logic command, the function R.L1'+R'.L1 is entered into the flip-flop L1. This operation is accomplished by an "and" gate 110 which has applied to its input the S1, S2' signals, the output of the R register and L1', and also by the "and" gate 112 which has applied to its input the S1, S2' signals as well as the output of the L1 flip-flop and the complement R' of the R register output. The outputs of both of these "and" gate are connected to the "or" gate 106. Finally in the presence of the (3) stored logic command there is an input to the L1 flip-flop which is either R.L1 or L2. An "and" gate 114 has applied to its input the S1 and S2 signals as well as the output of the R register and the output of the L1 flip-flop. The output of this "and" gate 114 is connected to the "or" gate 116. A second "and" gate 118 has applied to its input the S1 and S2 stored logic signals as well as the output of the L2 flip-flop. The output of the "and" gate 118 is also connected to the "or" gate 116 the output of which is applied to the "or" gate 106 which drives the flip-flop L1. Thus, an output from either "and" gate 114 or "and" gate 118 is applied to the L1 flip-flop as its input.

Considering now the inputs to the L2 flip-flop it will be seen that the L2 flip-flop circulates its contents in the presence of (0), (1) and (3) stored logic commands. Since for both the (0) and the (1) stored logic commands S1' appears an "and" gate 120 having applied to its input the output of the L2 flip-flop and the S1' signal as a gating signal suffices to take care of the situations. The output of the "and" gate 120 is applied to an "or" gate 122, the output from which serves to drive the flip-flop L2. The other circulate function is taken care of by an "and" gate 124 which has applied to its input the (3) stored logic signals S1, S2 and L2. The output of "and" gate 124 is connected to "or" gate 122. L2 also has applied to its input in the presence of stored logic command signals (2) the "and" function of the output of the register R and the condition of the flip-flop L1. "And" gate 126 has the signals S1, S2', L1 and R applied to its input and thus provides this function. The output of the "and" gate 126 applied to the "or" gate 122.

An output is obtained from the R register in the presence of the signals S1′, S2. These signals and the output of the R register are applied to an "and" gate 128.

The tables which follow are identical with the preceding tables provided for the single flip-flop version of this computer. Table VI shows the inputs to the L1 flip-flop which occur for various states of the L1 and L2 flip-flops as well as the R register output stage in the presence of the stored logic command signals. Similarly there is shown the inputs to the L2 flip-flop and the R register for the same sets of conditions.

TABLE VI toL1

| | S1 | S2 | | | | | | | | |
|---|---|---|---|---|---|---|---|---|---|---|
| (0) | 0 | 0 | 0 | 0 | 1 | 1 | 0 | 0 | 1 | 1 |
| (1) | 0 | 1 | 0 | 0 | 1 | 1 | 0 | 0 | 1 | 1 |
| (2) | 1 | 0 | 0 | 1 | 1 | 0 | 0 | 1 | 1 | 0 |
| (3) | 1 | 1 | 0 | 0 | 0 | 1 | 1 | 1 | 1 | 1 |
| | | R | 0 | 1 | 0 | 1 | 0 | 1 | 0 | 1 |
| | | L1 | 0 | 0 | 1 | 1 | 0 | 0 | 1 | 1 |
| | | L2 | 0 | 0 | 0 | 0 | 1 | 1 | 1 | 1 |

toL2

| | S1 | S2 | | | | | | | | |
|---|---|---|---|---|---|---|---|---|---|---|
| (0) | 0 | 0 | 0 | 0 | 0 | 0 | 1 | 1 | 1 | 1 |
| (1) | 0 | 1 | 0 | 0 | 0 | 0 | 1 | 1 | 1 | 1 |
| (2) | 1 | 0 | 0 | 0 | 0 | 1 | 0 | 0 | 0 | 1 |
| (3) | 1 | 1 | 0 | 0 | 0 | 0 | 1 | 1 | 1 | 1 |
| | | R | 0 | 1 | 0 | 1 | 0 | 1 | 0 | 1 |
| | | L1 | 0 | 0 | 1 | 1 | 0 | 0 | 1 | 1 |
| | | L2 | 0 | 0 | 0 | 0 | 1 | 1 | 1 | 1 |

toR

| | S1 | S2 | | | | | | | | |
|---|---|---|---|---|---|---|---|---|---|---|
| (0) | 0 | 0 | 0 | 1 | 0 | 1 | 0 | 1 | 0 | 1 |
| (1) | 0 | 1 | 1 | 1 | 1 | 1 | 1 | 1 | 1 | 1 |
| (2) | 1 | 0 | 0 | 0 | 0 | 0 | 0 | 0 | 0 | 0 |
| (3) | 1 | 1 | 0 | 1 | 1 | 0 | 0 | 1 | 1 | 0 |
| | | R | 0 | 1 | 0 | 1 | 0 | 1 | 0 | 1 |
| | | L1 | 0 | 0 | 1 | 1 | 0 | 0 | 1 | 1 |
| | | L2 | 0 | 0 | 0 | 0 | 1 | 1 | 1 | 1 |

As before a study of the inputs to L1, L2 and R as shown in Table VI leads to the simplification of these inputs expressed as logical Equations L, M and N.

$$toL1 = L1.S1' + L2.S1.S2 + (R'.L1 + R.L1').S1.S2' + S1.S2.R.L1 \quad (L)$$

$$1L1 = L1'.R.S1.S2' + L1'.L2.S1.S2 \quad (L')$$

$$0L1 = S1.S2'.R.L1 + S1.S2.R'.L1.L2' \quad (L'')$$

$$toL2 = (S1' + S2).L2 + R.L1.S1.S2' \quad (M)$$

$$1L2 = R.L1.S1.S2' \quad (M')$$

$$0L2 = (R' + L').S1.S2' \quad (M'')$$

$$toR = I.S1'.S2 + R.S1'.S2' + (R.L1' + R'.L1).S1.S2 \quad (N)$$

$$1R = I.S1'.S2 + S1.S2.L1.R' \quad (N')$$

$$0R = I'.S1'.S2 + S1.S2' + L1.S1.S2.R \quad (N'')$$

Figure 3B:
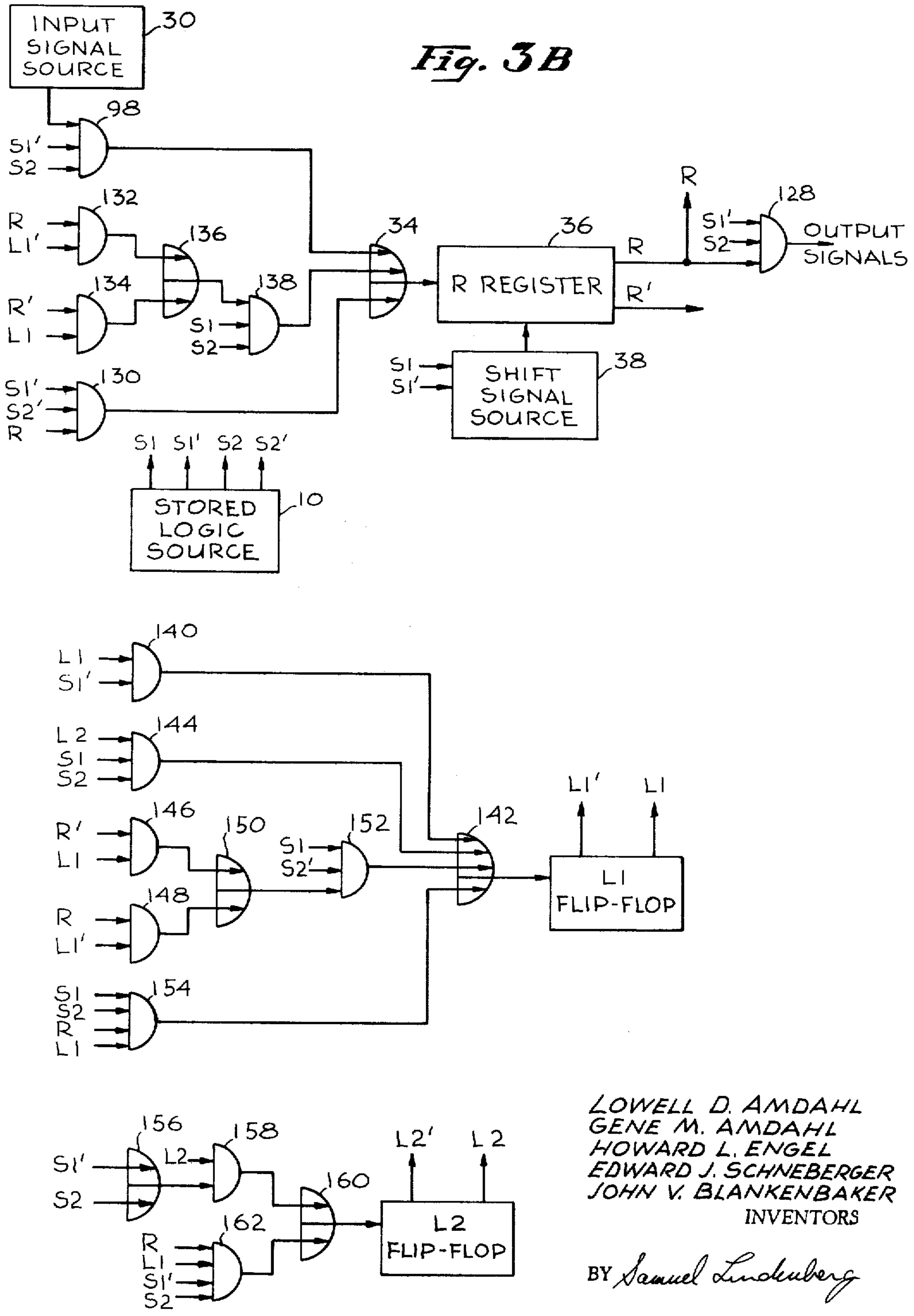

FIGURE 3B is a block schematic diagram of the simplified version of FIGURE 3A which is capable of accomplishing the identical functions as the computer represented in FIGURE 3A. Considering first the input to the R register is represented by the Equation N and the "and" gate 98 as before enables an input from the source of input signals 30 to be entered through "or" gate 34 into register R in the presence of stored logic signals S1′, S2. The output "and" gate 128 provides the same function as before, to enable a read out from the R register in the presence of the S1′ and S2 stored logic signals. The second function specified namely R, S1′, S2′ is accomplished by an "and" gate 130 receiving all of these signals at its input and having its output connected to the "or" gate 34. The third function which provides an input to the R register requires a first "and" gate 132 to the input of which are applied to the signals R, L1′, a second "and" gate 134 to the input of which are applied the signals R′, L1 and an "or" gate 136 to which the outputs of the "and" gate 132 and 134 are applied. The output of the "or" gate 136 is connected to an input of an "and" gate 138. Applied also to the "and" gate as gating signals are the S1 and S2 stored logic signals. The output of the "and" gate 138 is connected to the "or" gate 34. The arrangement shown and just described effectuates the entry into the R register of either R.L1′ or R′.L1 when the (3) stored logic command is given.

Considering next the logical Equation L, an input to the flip-flop L1 is effectuated upon the application of the S1′ stored logic signals and also L1 to an "and" gate 140, the output of which is connected to an "or" gate 142, the output of which drives the flip-flop L1. An "and" gate 144 enables the accomplishment of the second function, namely, the input to the L1 flip-flop of L2 upon the occurrence of the S1 and S2 stored logic signals. "And" gate 146 and 148 respectively have applied to their inputs R′.L1 and R.L1′. The outputs of these "and" gates are applied as inputs to an "or" gate 150. "Or" gate 150 output is applied to an "and" gate 152. The other two required gating inputs to the "and" gate are stored logic signals S1 and S2′. The output of this "and" gate 152 is applied to the "or" gate 142. Thus the third function in the logical Equation F is effectuated.

The last function in the logical Equation F is accomplished by "and" gate 154. The input signals are S1, S2 or the output of the output register 36 and L1. The output of the "and" gate 152 is connected to the "or" gate 142.

The logical Equation M represents the inputs to the L2 flip-flop. The first of these functions is achieved by having an "or" gate 156 to the input of which are applied the stored logic signals S1′ and S2′. The output of the "or" gate 156 is applied to an "and" gate 158. The second required input to the "and" gate is the output to the L2 flip-flop. The output of the "and" gate 158 is applied to the "or" gate 160, the output of which drives the flip-flop L2. The second function specified in the logical Equation G is achieved by the "and" gate 162 which has applied to its input S1′ and S2′, two stored logic signals, the output of the L1 flip-flop, and the output of the R register. The output of the "and" gate 162 is applied to the "or" gate 160.

If it is assumed that the flip-flops L1 and L2 and the register input have 1 setting and 0 setting input circuits (bistable state flip-flops), then the functions that set the L1 flip-flop to 1 and 0 are shown by the logical Equations L′ and L″ underneath the Equation L. The Equations M′, M″ underneath the Equation M are those for setting L2 to the 1 state or 0 state. The Equations N′, N″ underneath the Equation N are those which will establish a 1 or 0 input stage of the register.

The improvement in speed of operation through the use of two flip-flops L1 and L2 is illustrated in the addition or subtraction example shown in Table VII below.

TABLE VII

| | 1 | 2 | 3 | 4 | 5 | 6 | 7 | 8 . . . | | 2n | |
|---|---|---|---|---|---|---|---|---|---|---|---|
| | $A_1$ | $B_1$ | $A_2$ | $B_2$ | $A_3$ | $B_3$ | $A_4$ | $B_4$ . . . $A_n$ | | $B_n$ . . . working | |
| 1 | 1 | 1 | 1 | 1 | 1 | 1 | 1 | 1 | 1 | 1 | Input. |
| 2 | 2 | 3 | 2 | 3 | 2 | 3 | 2 | 3 | 2 | 3 | Formation of result. |
| 3 | - | 1 | - | 1 | - | 1 | - | 1 | - | 1 | Output. |

The numbers 1 through 2n in Table VII represent the various storage positions of the R register. It is assumed that an input is provided to enable entering into the register the first binary number $A_1$, $A_2$ . . . $A_n$ so that the various digits occupy positions 1, 3, 5, in the shift register. It is further assumed that a second binary number comprising digits $B_1$, $B_2$ . . . $B_n$ are also entered into the shift register occupying the register positions 2, 4 . . . $\mathbf{2_n}$. The stored logic command (1) which occurs during the first cycle indicates the entry of the two binary numbers A and B into the indicated register positions. During the second minor cycle of operation, the logical functions defined by stored logic codes (2), (3) of Table V are alternated which causes the computer to operate in a manner so that first a digit of number A is combined with any previous carry existing in L1 and then entered into flip-flop L2 which combines A and the previous carry to form a new carry or a half sum. Effectively, the logic which is entered into the flip-flop L1 may be represented by the logical equation to $$L1=A.C'+A'.C$$

which is the half sum of A and the previous carry whereas the logic which is being entered into flip-flop L2 is to $L2=A.C$. It should be remembered that these logical equations effectively are identical with those shown associated with the stored logic command (2).

Logical code (3) then effectively defines the formation of the full sum and the carry, the full sum being recorded into the variable position where the B digit was previously. That is, the operation is performed by adding A to B and storing the results in the B variable position. The full sum entered into the register position according to stored logic command (3) may be represented as:

$$toR=B.(A.C'+A'.C)'+B'.(A.C'+A'.C)$$
$$=B.A.C+B.A'.C'+B'.A.C'+B'.A'.C$$

which will be recognized as the conventional definition for the full sum.

The full carry function entered into flip-flop L1 according to code (3) effectively is defined as any previous half carry stored in flip-flop L2. That is, as defined above, A.C or B.(A.C'+A'.C) which results from the fact that the half sum of signals A and C had previously been entered into flip-flop L1 according to code (2) and signal R in the definition for flip-flop L1 corresponds to a digit of number B. The function to L1 may then be expressed in terms of the full carry as follows:

$$toL1=B.(A.C'+A.'C)+A.C$$
$$=B.A+B.C+A.C$$

which will be recognized as the conventional full carry function.

After the full sum digits are generated and entered into the B position, they may then be read out by the output function defined in code (1).

It should be evident, therefore, that the use of two flip-flops to perform simultaneous functions greatly expedites the basic computing process described above. The same type of computing may, of course, be done for subtraction as defined in Tables V*a* and VI*a* below:

TABLE V*a*

| | S1 | S2 | |
|---|---|---|---|
| (0) | 0 | 0 | toR=R; toL1=L1; toL2=L2 |
| (1) | 0 | 1 | toR=input signal; output=R; toL1=L1; toL2=L2 |
| (2) | 1 | 0 | toR=0; toL1=R(+)L1; toL2=R.L1 |
| (3) | 1 | 1 | toR=R(+)L1; toL1=R'.L1+L2; toL2=L2 |

TABLE VI*a* toL1

| | S1 | S2 | | | | | | | | |
|---|---|---|---|---|---|---|---|---|---|---|
| (0) | 0 | 0 | 0 | 0 | 1 | 1 | 0 | 0 | 1 | 1 |
| (1) | 0 | 1 | 0 | 0 | 1 | 1 | 0 | 0 | 1 | 1 |
| (2) | 1 | 0 | 0 | 1 | 1 | 0 | 0 | 1 | 1 | 0 |
| (3) | 1 | 1 | 0 | 0 | 1 | 0 | 1 | 1 | 1 | 1 |
| | | R | 0 | 1 | 0 | 1 | 0 | 1 | 0 | 1 |
| | | L1 | 0 | 0 | 1 | 1 | 0 | 0 | 1 | 1 |
| | | L2 | 0 | 0 | 0 | 0 | 1 | 1 | 1 | 1 |

toL2

| | S1 | S2 | | | | | | | | |
|---|---|---|---|---|---|---|---|---|---|---|
| (0) | 0 | 0 | 0 | 0 | 0 | 0 | 1 | 1 | 1 | 1 |
| (1) | 0 | 1 | 0 | 0 | 0 | 0 | 1 | 1 | 1 | 1 |
| (2) | 1 | 0 | 0 | 0 | 0 | 1 | 0 | 0 | 0 | 1 |
| (3) | 1 | 1 | 0 | 0 | 0 | 0 | 1 | 1 | 1 | 1 |
| | | R | 0 | 1 | 0 | 1 | 0 | 1 | 0 | 1 |
| | | L1 | 0 | 0 | 1 | 1 | 0 | 0 | 1 | 1 |
| | | L2 | 0 | 0 | 0 | 0 | 1 | 1 | 1 | 1 |

The table for the function toR is not shown since this is the same as derived above from Table VI. The following logic may be derived from Table VI*a* defining the functions for flip-flops L1 and L2:

$$toL1=L1.S1'+R.L1'+S1.S2'+L2.S1.S2+R'.L1$$
$$1L1=L1'.R.S1.S2'+L1'.L2.S1.S2$$
$$0L1=S1.R.L1.(S2'+L2')$$
$$toL2=(S1'+S2).L2+R'.L1.S1.S2'$$
$$1L2=S1.S2'.R.L1$$
$$0L2=S1.S2'.(R'+L1')$$

The circuit for the computer defined by the logical equations in Table V*a* should be apparent from the preceding descriptions herein illustrating the formation of the structure of the computers in the light of the associated logical equations.

It will now be shown that the counting function illustrated in Table III may also be solved with the same basic structure shown in FIGURE 3 by adding four additional stored logical codes with appropriate definitions as shown in Table V*b* below:

TABLE V*b*

| | S1 | S2 | S3 | |
|---|---|---|---|---|
| (0) | 0 | 0 | 0 | toR=R: toL1=L1; toL2=L2 |
| (1) | 0 | 1 | 0 | toR=input signal; output=R; toL1=L1; toL2=L2 |
| (2) | 1 | 0 | 0 | toR=R; toL1=R'L1+R'.L'; toL2=R.L1 |
| (3) | 1 | 1 | 0 | toR=R'.L1+R.L1'; toL1=R.L1+L2; toL2=L2 |
| (4) | 0 | 0 | 1 | toR=R; toL1=R.L1; toL2=L2 |
| (5) | 0 | 1 | 1 | toR=R; toL1=R'.L1; toL2=L2 |
| (6) | 1 | 0 | 1 | toR=R; toL1=1; toL2=L2+L1 |
| (7) | 1 | 1 | 1 | toR=L2; toL1=1; toL2=0 |

Figure 3C:
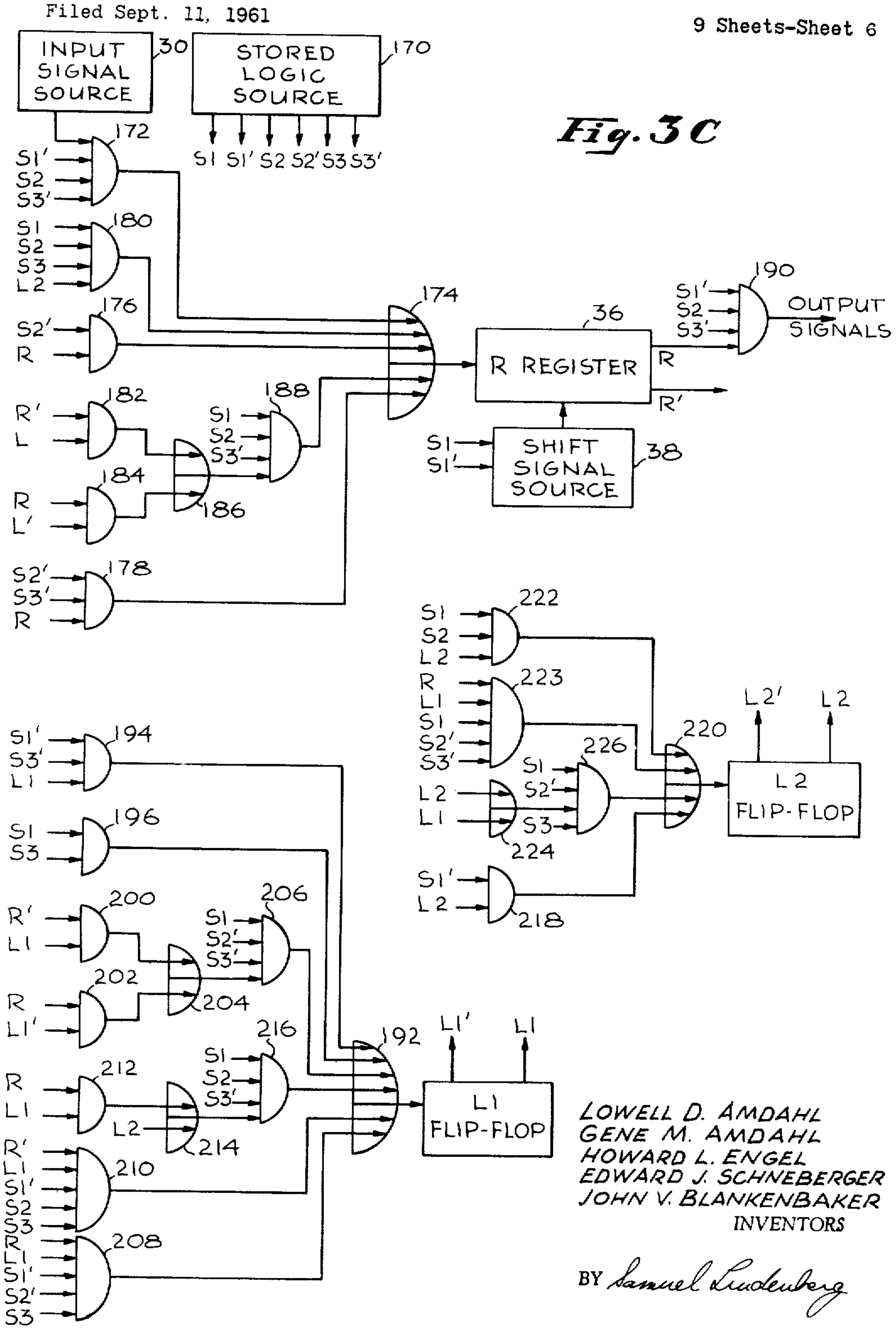

A block schematic diagram of the computer which can perform the functions called for in Table V*b* is shown in FIGURE 3C. A source of stored logic signals 170 produces the combination of S1, S2, S3 signals and S1', S2', S3' signals which are required. The inputs to the R register comprise signals received from the source of input signals 30 which are applied to "and" gate 172 which also receives as an input the stored logic signals S1', S2 and S3'. The output of "and" gate 172 is connected to the input "or" gate 174.

The circulate function for the R register occurs in the presence of the stored logic command (0), (2), (4), (5) and (6). It will be seen that in these commands that S2' is present except for command (5). Thus, all that is required to fulfill the circulate functions for (0), (2), (4) and (6) is an "and" gate 176 having as its gating input S2', an R input and its output connected to the "or" gate 174. Another "and" gate 178 having as its inputs the signal S2', S3' and R takes care of the (5) toR function. The output of the "and" gate 178 is connected to the "or" gate 174. The input toR called for by stored logic command (7) is performed by "and" gate 180 which has applied to its inputs signals S1, S2, S3 and the output of L2. The ouput of the "and" gate 180 is connected to the input to the "or" gate 174. The input toR called for by the stored logic code (3) is provided by an "and" gate 182 to the inputs which are supplied to the signals R' and L, and a second "and" gate 184 having as its inputs R and L'. The outputs of "and" gate 182 and 184 are applied to an "or" gate 186. The output of the "or" gate 186 is applied to a succeeding "and" gate 188. The "and" gate 188 has as its gating inputs signals S1, S2 and S3' (stored logic code) (3). The ouput of the "and" gate 188 is applied to the "or" gate 174.

An output is derived from the R register in the presence of signals S1', S2 and S3' which together with the output of the R register are applied to an "and" gate 190. The output of the "and" gate 190 is delivered externally to the computer.

Considering next the L1 flip-flop, it is driven by the output of an "or" gate 192. The L1 flip-flop circulates its output in the presence of either the stored logic code (0) or the stored logic code (1). These have in common the occurrence of the S1' and S3' signals simultaneously, which does not occur with the rest of the stored logic code. Therefore, the function for the circulation of the contents of the L1 flip-flop may be specified by applying S1' and S3' signals as well as L1 to and "and" gate 194, the output of which is applied to the "or" gate 192.

For the stored logic command (6) and (7), the input to the L1 register is 1. These two stored logic codes have the signal S1 and S3 occurring simultaneously, which is not common to any of the other stored logic codes. Therefore, this specified function may be carried out by providing "and" gate 196 to which are supplied S1 and S3 signals. The outpu of the "and" gate 196 is applied to the "or" gate 192 and will drive L1 to its "1" representative state if not already there.

Stored logic command (2) calls for the entry into L1 of either R.L1', or R'.L1. This is specified by providing an "and" gate 200 to the input of which are applied the signals R' and L1. A second "and" gate 202 is provided to the input of which are provided the signals R and L1'. The outputs of "and" gates 200, 202 are applied to an "or" gate 204 the output of which is applied to a succeeding "and" gate 206. Also applied to "and" gate 206 are the stored logic signals S1, S2', S3' which is stored logic command (2). The output of the "and' gate 206 is applied to the "or" gate 192.

The functions specified by the stored logic command (4) is achieved by providing an "and' gate 208 having as its inputs the signals R, L1, S1', S2' and S3. The functions specified by stored logic command (5) with respect to an input to L1 is provided by an "and" gate 210 having as its inputs R', L1, S1', S2 and S3. The output of "and" gate 210 is coupled to the input to the "or" gate 192.

The functions specified by the command (3) is with respect to an input to L1 achieved by providing an "and" gate 212 having as its two inputs R and L1. The output of the "and" gate 212 is applied to a succeeding "or" gate 214 having as a second input the output of the L2 flip-flop. The output of the "or" gate 214 is applied to a succeeding "and" gate 216. This has as further required gating inputs the stored logic code (3) comprising signals S1, S2 and S3'. The output of the "and" gate 216 is connected to the input of the "or" gate 192.

There remains the specification of the input functions of the flip-flop L2. The circulate L2 operation occurs in response to the stored logic commands (0), (1), (3), (4) and (5). Stored logic commands (0), (1), (4), and (5) have in common the S1' signal not found in any of the other stored logic commands. Thus, these four circulate commands may be satisfied by providing a single "and" gate 218 having as its inputs the signal S1' in the output of the L2 flip-flop. The output of "and" gate 218 is applied to an "or" gate 220. The circulate function in response to the (3) stored logic command may be effectuated by having an "and" gate 222 having its inputs as S1, S2 and L2. The output of "and" gate 222 is applied to the "or" gate 220.

The functions specified by the stored logic commands (2) is achieved by an "and" gate 223 having as its inputs R, L1, and the stored logic signals S1, S2' and S3'.

The stored logic functions specified by stored logic code (6) is achieved by providing an "or" gate 224 having as its two inputs the L2 and L1 flip-flop signals. The output of the "or" gate 224 is applied to an "and" gate 226 having as its required gating inputs stored logic code (6) comprising S1, S2' and S3. The output of the "and" gate 226 is applied to the "or" gate 220.

The functions specified by the stored logic command (7) is achieved by omitting an input during the digit time of the occurrence of the signals S1, S2 and S3 whereby flip-flop L2 resets to 0.

The manner in which the computer represented (FIGURE 3C) may be operated to perform the counting function specified in connection with Table IV are illustrated in Table VII*a* shown below.

TABLE VII*a*

| | 1 | 2 | 3 | 4 | 5 | 6 | |
|---|---|---|---|---|---|---|---|
| | A | B | C | G | H | | |
| 1 | | | | 1 | | | |
| 2 | 5 | 4 | 4 | 4 | 5 | 6 | A'.B.C.G.H'=F1 |
| 3 | 4 | 5 | - | 4 | 5 | 6 | F1+A.B'.G.H'=F2 |
| 4 | 4 | - | 5 | 4 | 5 | 6 | F2+A.C'.G.H'=F3 |
| 5 | 4 | - | - | 5 | - | 6 | F3+A.G'=F4 |
| 6 | 4 | - | - | - | 4 | 6 | F4+A.H=toA |
| 7 | 7 | 4 | 5 | 4 | 5 | 6 | B.C'.G.H'=F5 |
| 8 | - | 5 | 4 | 4 | 5 | 6 | F5+B'.C.G.H'=F6 |
| 9 | - | 4 | - | 5 | - | 6 | F6+B.G'=F7 |
| 10 | - | 4 | - | - | 4 | 6 | F7+B.H=toB |
| 11 | - | 7 | 5 | 4 | 5 | 6 | C'.G.H'=F8 |
| 12 | - | - | 4 | 5 | - | 6 | F8+C.G'=F9 |
| 13 | - | - | 4 | - | 4 | 6 | F9+C.H=toC |
| 14 | - | - | 7 | 4 | - | 7 | toH |
| 15 | 4 | 4 | 4 | 4 | 5 | 6 | A.B.C.G.H' |
| 16 | - | - | - | 7 | - | 4 | |
| 17 | 6 | - | - | - | 7 | - | |

The operation of the computer in response to the stored logic codes specified in Table VII*a* should be clear in view of the detailed explanation previously given. Each "and" function in the counting problem defined is formulated by using stored logic code (5) each time the variable is complemented in the respective "and" function. Stored logic code (4) is used when the variable is used without complementation. Flip-flop L1 is sequentially operated to assume a state representing the "and" function up to and including the last variable sense so that at the end of each minor cycle, the state of flip-flop L1 indicates whether or not the "and" function has been satisfied. The state of flip-flop L1 is then transferred to flip-flop L2 by utilizing stored logic code (6), flip-flop L2 having been previously set to 0 at the end of the major cycle (see minor cycle 17 variable position 5) so that the first entry into flip-flop L2 is the signal of flip-flop L1. For convenience, the first "and" function is indicated in Table VII*a* to be the function F1. Minor cycle 3 then computes the second "and" function and combines it as an "or" function in flip-flop L2. This sequence is continued through minor cycle 6 which results in the function (toA).

During the minor cycle in Group II, a similar sequence is performed whereby each "and" circuit is computed and entered into flip-flop L1 and then combined as an "or" function in flip-flop L2. It will be noted that the new variable for A, B and C is stored immediately after being produced so that the output function A.B.C.G.H′ in the example of Table VII*a* represents the next state of the counter after the receipt of a counting pulse G. This, of course, changes the phasing of the computing cycle but does not affect the basic operation.

It is possible, of course, to perform the type of computation illustrated in Table VII*a* with only a single logical flip-flop. In this case, the "or" function defined in code (6) is entered directly into the register. It is assumed, as above, that provision is made whereby the register variable may be read and a new variable may be entered into the same digit position without delay. Effectively this simply means that the register may be recirculated while it is being read.

Figure 4:
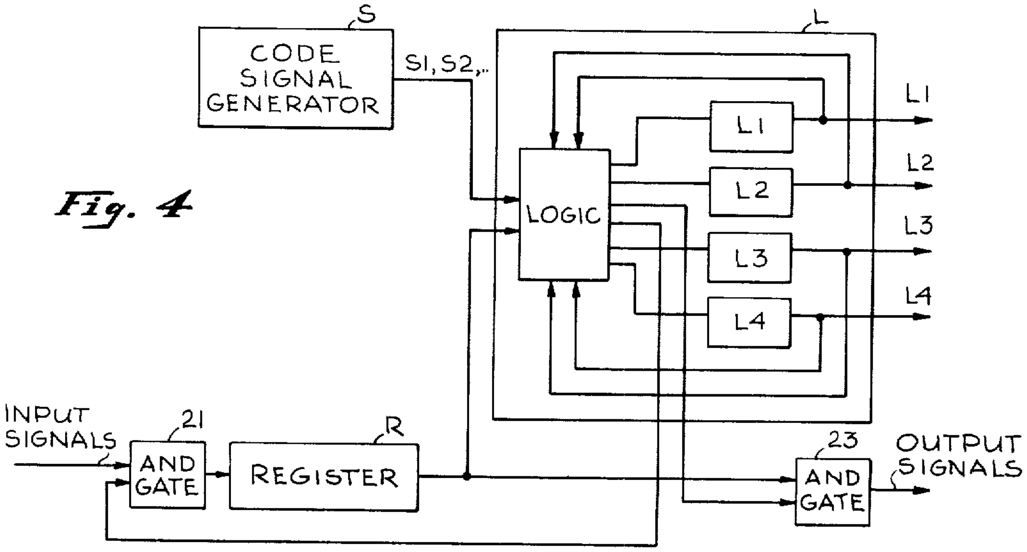
FIGURE 4 is a block diagram illustrating the four logical flip-flop arrangements in accordance with the invention.

While the computer techniques taught herein may obviously be extended to even the most complex system having high-speed modes of operation, it is believed to suffice here to show one more example in the form of an arrangement adapted for addition, subtraction, and multiplication. The general form of the system is illustrated in FIGURE 4 where it will be noted that the structure is similar to that previously shown except that four logical flip-flops are employed; namely, L1, L2, L3 and L4. For the purpose of illustration, it will be assumed that flip-flop L3 stores the sign of the operation, that is, indicates whether addition or subtraction is to be performed, and that flip-flop L4 stores the multiplier digit value. The stored logic code definition suitable for performing addition, subtraction, and multiplication is indicated in Table VIII below.

TABLE VIII (No functions shown means no change)

Figure 4A:
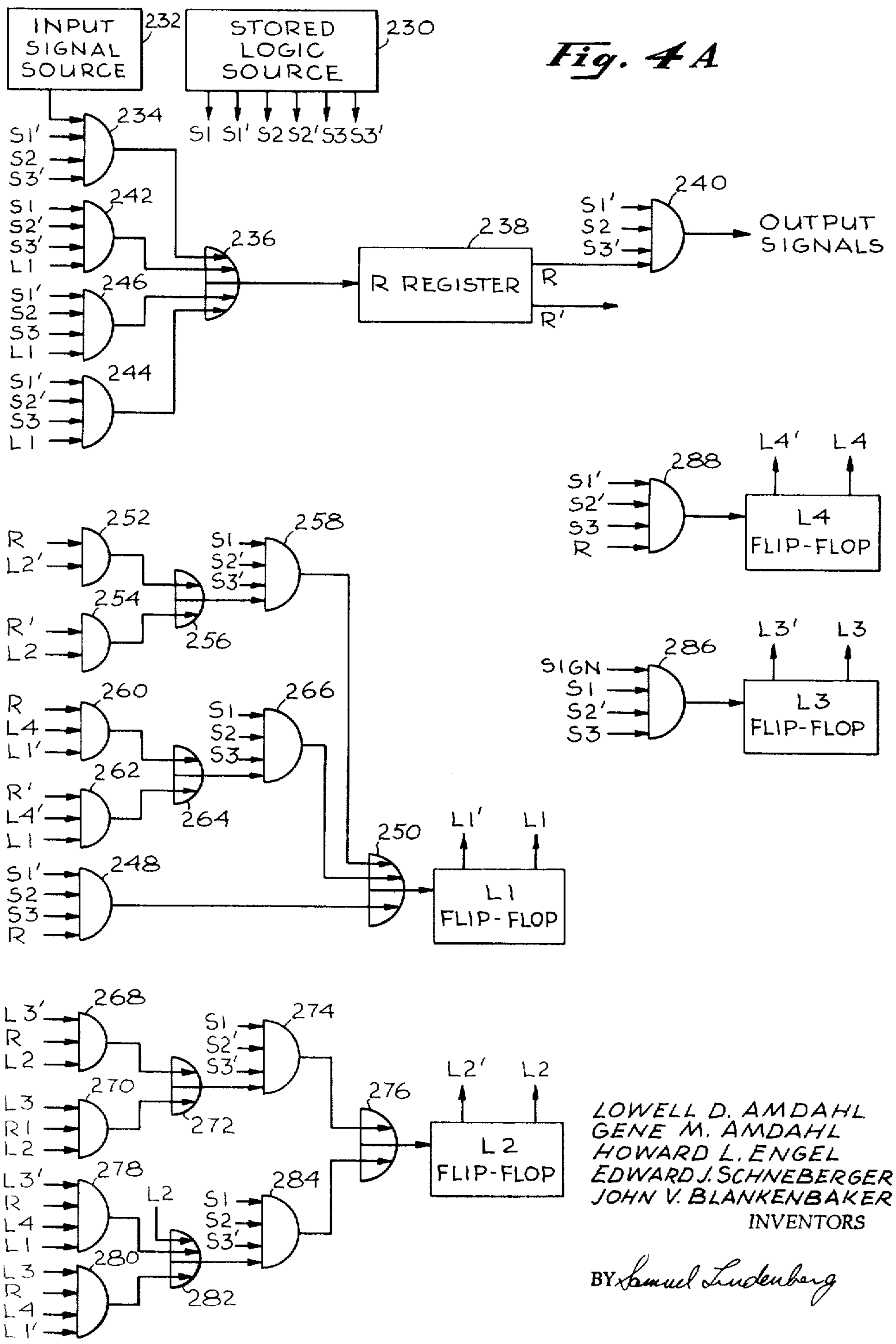
FIGURES 4A and 4B are more detailed schematic block diagrams illustrating variations achievable with the four flip-flop computer as exemplified by the generalized block diagram of FIGURE 4.

(0)
(1) toR=I; output=R
(2) toR=L1; toL1′=R′.L2+R.L2′; toL2=L3′.R.L2+L3.R′.L2
(3) toL1=R.L4.L1′+R′.L4′.L1; toL2=L2+L3′.(R.L4).L1+L3.(R.L4).L1′
(4) toR=L1; toL4=R
(5) toR=L1; toL1=R
(6) toL3=sign of operation FIGURE 4A is a more detailed block schematic diagram of the computer specified by Table VIII. There is provided the source of stored logic codes 230. The source of input signals 232 is connected to an "and" gate 34 having as its input the stored logic code (1) or signals S1′, S2, S3′. The output of "and" gate 234 is connected to an "or" gate 236 which in turn drives the R register 238. The output from the R register is applied to an "and" gate 240 which also has the stored logic code (1) signals applied as gating signals. The output of the "and" gate 240 is the external output.

It is noted that there is an input to R from L1 on commands (2), (4) and (5). These functions are achieved by "and" gates 242, 244 and 246. The input to "and" gate 242 is the (2) command comprising S1, S2′ and S3′ and of course L1. The output of the "and" gate 242 is connected to the "or" gate 236. The (4) command is applied to "and" gate 244 and comprises S1′, S2′ and S3. The final input to this "and" gate is L1 and the output of the "and" gate is connected to the "or" gate 236. The "and" gate 246 has as its input S1′, S2 and S3 and also L1. Its output is connected to the "or" gate 236.

The inputs to L1 comprise the following: first an R input upon the occurrence of command (5). This is effectuated by the "and" gate 248 having as its input S1′, S2, S3 and R. The output of the "and" gate 248 is applied to an "or" gate 250 the output of which drives the L1 flip-flop to the condition indicated on its input line. The exclusive "or" function which is the input to L1 upon the occurrence of the (2) command is effectuated by an "and" gate 252 having as its input R and L2′, another "and" gate 254 has as its input R′ and L2, the outputs of "and" gates 252 and 254 are applied to an "or" gate 256. The output of the "or" gate is connected to another "and" gate 258 having as its gating inputs a (2) command comprising the signals S1, S2′ and S3′. The output of the "and" gate 258 is connected to the input of the "or" gate 250.

The other exclusive "or" function which occurs at the input to L1 upon the occurrence of the (3) stored logic command is effectuated by an "and" gate 260 having as its input R, L4 and L1′, an "and" gate 262 having as its input R′, L4′ and L1, both of these "and" gates connecting their outputs to an "or" gate 264. The output of the "or" gate 264 is connected to another "and" gate 266 having as its gating inputs the stored logic command signals S1, S2 and S3′.

The input function toL2 which occurs when the stored logic command (2) is applied to the input circuit is effectuated by an "and" gate 268 to the input of which are applied L3′, R and L2. The second "and" gate 270 has L3, R1 and L2 applied to its inputs. The outputs of the "and" gate 268 and 270 are applied to "or" gate 272. The output of the "or" gate 272 is connected to the input of an "and" gate 274 having the (2) stored logic signals S1, S2′ and S3′ applied thereto as gating signals. The output of the "and" gate 274 is applied to an "or" gate 276 which drives L2 with its output. The other L2 function which occurs upon the application of the stored logic command (3) to its input circuitry is provided by an "and" gate 278 having the inputs L3′.R, L4 and L1 and the "and" gate 280 having as its inputs L3.R, L4 and L1′. The outputs of "and" gates 278 and 280 are connected to an "or" gate 282 which has an additional input comprising L2. The output of the "or" gate 282 is applied to "and" gate 284 which has applied thereto the gating signals S1, S2 and S3′. The output of the "and" gate 284 is connected to the "or" gate 276.

L3 is driven to represent the sign of the operation upon the occurrence of the (6) stored logic command signals. This function is provided by the "and" gate 286 which has gating signals S1 and S2′ and S3 applied to its input (6) stored logic command, as well as the binary digit representing the sign. The flip-flop L3 is driven in response to the output of the "and" gate 286.

The L4 flip-flop stores the output of the R register upon the occurrence of the (4) stored logic command. "And" gate 288 provides this function and has applied to its inputs the gating signals S1, S2, S3′ as well as the output of the R register. The output of the "and" gate 288 is applied to the flip-flop L4 to drive to the condition indicated by such output.

A multiplication example using the logic set forth in Table VIII above is shown below in Table IX. In this example, flip-flop L3 remains in a zero state since multiplication is performed as a series of additions. It will be understood, however, that the example of Table IX may readily be modified to perform multiplication as a series of subtractions in which case flip-flop L3 remains in the binary 1 state throughout.

TABLE IX

| | ←—— t | | | | | | | | | | | | | | | | | |
|---|---|---|---|---|---|---|---|---|---|---|---|---|---|---|---|---|---|---|
| | $C_5$ | $A_9$ | $C_4$ | $A_8$ | $C_3$ | $A_7$ | $C_2$ | $A_6$ | $C_1$ | $A_5$ | $B_4$ | $A_4$ | $B_3$ | $A_3$ | $B_2$ | $A_2$ | $B_1$ | $A_1$ |
| | 18 | 17 | 16 | 15 | 14 | 13 | 12 | 11 | 10 | 9 | 8 | 7 | 6 | 5 | 4 | 3 | 2 | 1 |
| R | 1 | 0 | 1 | 0 | 0 | 0 | 1 | 0 | 0 | 0 | 1 | 0 | 1 | 0 | 1 | 0 | 1 | 0 |
| S | 4 | – | 5 | – | 5 | – | 5 | – | 5 | – | – | – | – | – | – | – | – | – |
| R | 1 | 0 | 0 | 0 | 1 | 0 | 0 | 0 | 0 | 0 | 1 | 0 | 1 | 0 | 1 | 0 | 1 | 0 |
| L1 | 0 | 0 | 0 | 0 | 0 | 0 | 0 | 0 | 0 | 1 | 0 | 1 | 0 | 1 | 0 | 1 | 0 | 0 |
| L2 | 0 | 0 | 0 | 0 | 0 | 0 | 0 | 0 | 0 | 0 | 0 | 0 | 0 | 0 | 0 | 0 | 0 | 0 |
| L4 | 1 | 1 | 1 | 1 | 1 | 1 | 1 | 1 | 1 | 1 | 1 | 1 | 1 | 1 | 1 | 1 | 1 | 1 |
| S | 4 | – | 5 | – | 5 | – | 5 | 2 | 3 | 2 | 3 | 2 | 3 | 2 | 3 | 2 | 3 | 2 |
| R | 0 | 0 | 1 | 0 | 0 | 0 | 0 | 0 | 0 | 1 | 1 | 1 | 1 | 1 | 1 | 1 | 1 | 0 |
| L1 | 0 | 0 | 0 | 0 | 0 | 1 | 1 | 0 | 0 | 1 | 0 | 1 | 0 | 0 | 1 | 1 | 0 | 0 |
| L2 | 0 | 0 | 0 | 0 | 0 | 0 | 0 | 1 | 1 | 1 | 1 | 1 | 1 | 1 | 0 | 0 | 0 | 0 |
| L4 | 1 | 1 | 1 | 1 | 1 | 1 | 1 | 1 | 1 | 1 | 1 | 1 | 1 | 1 | 1 | 1 | 1 | 1 |
| S | 4 | – | 5 | – | 5 | 2 | 3 | 2 | 3 | 2 | 3 | 2 | 3 | 2 | 3 | 2 | 3 | 2 |
| R | 1 | 0 | 0 | 0 | 0 | 1 | 0 | 0 | 0 | 1 | 1 | 1 | 1 | 0 | 1 | 1 | 1 | 0 |
| L1 | 0 | 0 | 0 | 1 | 1 | 0 | 0 | 1 | 1 | 1 | 1 | 0 | 0 | 1 | 1 | 0 | 0 | 0 |
| L2 | 0 | 0 | 0 | 0 | 0 | 0 | 0 | 0 | 0 | 0 | 0 | 0 | 0 | 0 | 0 | 0 | 0 | 0 |
| L4 | 0 | 0 | 0 | 0 | 0 | 0 | 0 | 0 | 0 | 0 | 0 | 0 | 0 | 0 | 0 | 0 | 0 | 0 |
| S | 4 | – | 5 | 2 | 3 | 2 | 3 | 2 | 3 | 2 | 3 | 2 | 3 | 2 | 3 | 2 | 3 | 2 |
| R | 0 | 0 | 0 | 1 | 0 | 0 | 0 | 1 | 0 | 1 | 1 | 0 | 1 | 1 | 1 | 0 | 1 | 0 |
| L1 | 0 | 1 | 1 | 1 | 1 | 0 | 0 | 0 | 0 | 0 | 1 | 0 | 1 | 1 | 0 | 1 | 0 | 0 |
| L2 | 0 | 0 | 0 | 0 | 0 | 1 | 1 | 1 | 1 | 1 | 0 | 1 | 0 | 0 | 0 | 0 | 0 | 0 |
| L4 | 1 | 1 | 1 | 1 | 1 | 1 | 1 | 1 | 1 | 1 | 1 | 1 | 1 | 1 | 1 | 1 | 1 | 1 |
| S | 4 | 2 | 3 | 2 | 3 | 2 | 3 | 2 | 3 | 2 | 3 | 2 | 3 | 2 | 3 | 2 | 3 | 2 |
| R | 0 | 1 | 0 | 1 | 0 | 0 | 0 | 0 | 0 | 0 | 1 | 0 | 1 | 1 | 1 | 1 | 1 | 0 |
| | | $P_8$ | | $P_7$ | | $P_6$ | | $P_5$ | | $P_4$ | | $P_3$ | | $P_2$ | | $P_1$ | | |

Product $= P_1\ P_2\ P_3\ P_4\ P_5\ P_6\ P_7\ P_8$

L3=O

In the table it will be noted that at the left hand side there are indicated the numbers 1 through 6 corresponding to the cycles of the computer as before. The letters R, L1, L2, L4 and S which are found at the left side of the table indicate that the row adjacent that letter respectively represents the state of the R register, the state of the L1 flip-flop, the state of the L2 flip-flop, the state of the L4 flip-flop, and the stored logic signals or commands specified during the specified cycle. Thus, the state of the R register is represented at the beginning of cycle 1. The stored logic command which occurred dur-cycle 1 is shown. Adjacent the R in cycle 2 is the contents of the R register as a result of the operations specified by the stored logic commands during cycle 1.

It will be noted in Table IX that the signals of register R are shown with variable positions running from right to left so that the time sequence presents binary numbers in the conventional representation where the most significant digit appears at the left. Variable positions 1, 3, 5, 7, 9, 11, 13, 15, and 17 are used to store the accumulated number of the partial product and then the final product. This number may be referred to as "A." Variable positions 2, 4, 6 and 8 store the multiplicand, which may be referred to hereinafter as the "B" number. Variable positions 10, 12, 14, 16, and 18 store the multiplier which may be referred to hereinafter as the "C" number.

It will be noted that stored logic code (4) in Table VIII provides for the entry into flip-flop L4 of the register digit and that logical code (4) appears in variable position 18 in Table IX. The purpose of this is to transfer the most significant multiplier digit into flip-flop L4 to control the next minor cycle of operation. During each cycle then, the multiplier number C is shifted to the left so that the multiplier digits are sensed in descending order of significance according to the stored logic code (4). Code (5) in Table VIII provides for the shifting of the register signals through flip-flop L1 back to the register position corresponding to the next higher multiplier place. To be more particular, it will be noted that variable digit $C_4$ which is the second most significant multiplier digit is picked up according to stored logic code (5) during the first minor cycle of operation and is then entered into variable position $C_5$ at the end of minor cycle 1 under the control of stored logic code (4) which simultaneously transfers the previous digit to flip-flop L4.

The example of Table IX is arranged to form the product of two binary numbers C and B as follows:

```
B      1 1 1 1
C      1 1 0 1
      --------
       1 1 1 1
     1 1 1 1
   1 1 1 1
 ---------------
 1 1 0 0 0 0 1 1
```

During the second minor cycle, flip-flop L4 remains in the binary 1 state corresponding to the value of the most significant multiplier digit and the multiplicand B is added to the previously accumulated number A which is assumed in this example to be zero. Thus, the register signals appearing in variable positions 3, 5, 7, and 9 during minor cycle 3 represent the binary number 1111 or the first addition of the multiplicand. The multiplicand itself is retained in the register as shown in minor cycle 3 in variable positions 2, 4, 6, and 8. The manner in which the addition is performed for multiplication will be understood after stored logic codes (2) and (3) are examined with reference to Tables VIII and IX.

According to stored logic code (2), register R receives the signal of flip-flop L1. Flip-flop L1 at the same time receives the half sum or exclusive "or" function of the variables R and L2. In this case, R represents the previously accumulated register digit in number A and L2 stores any carry. The entry into flip-flop L2 according to stored logic code (2) is a half carry between register R and any previous carry in flip-flop L2.

According to stored logic code (3), the register signals are retained or recirculated. The purpose of this is to hold the multiplicand digits in position. Thus, it will be noted in Table IX that stored logic code (3) is found in variable positions corresponding to the multiplicand digits. According to stored logic code (3), flip-flop L1 receives the full sum which is generated by entering a half sum into flip-flop L1 and is gated according to the multiplier digit stored in flip-flop L4. At the same time, flip-flop L2 receives a full carry signal generated as the function of any previously generated half carry or as a new carry resulting from the combination of the signal in flip-flop L1 and the register signal, which at this time represents the multiplicand and is gated according to the multiplier digit in L4.

Referring now specifically to Table IX and to minor cycle 3, a typical addition process will be examined. At the beginning of minor cycle 3, flip-flops L1 and L2 are in a zero state, carried over from the end of minor cycle 2, and flip-flop L4 is in a binary 1 state corresponding to the second multiplier digit. Stored logic code (2) appears in the first variable position specifying the formation of a half sum between the register signal R and any previous carry signal in flip-flop L2. Since both signals R and L2 are zero, the half sum entered into flip-flop L1 is zero and appears in this manner in variable or digit position 2. In a similar manner, the half carry between R and L2 is zero and is entered into flip-flop L2 appearing in digit position 2. At digit position 2 and in minor cycle 3, stored logic code (3) appears and specifies that the register signal R is to be retained in position. This function results in the recirculation of this register signal so that during the same digit position of minor cycle 4, a binary 1 appears. That is, the binary 1 in digit position 2 during minor cycle 3 is effectively recirculated or retained so that it appears in digit position 2 at minor cycle 4. This corresponds to the retention of the multiplicand digits as explained above. At the same time the full carry function is formulated and entered into flip-flop L1. In this specific case, the product of R and L4 is equal to 1 and it is added as a half sum to the signal in flip-flop L1 which is zero. A binary 1 is then entered into flip-flop L1 and appears therein in digit position 3 of minor cycle 3. No carry is generated at this time so that a zero appears in digit position 3 of minor cycle 3 for flip-flop L2.

The operation just described is continued throughout minor cycles 3, 4, and 5 so that each stored logic code (2) specifies the half sum of signals R and L2 into flip-flop L1 and the half carry into L2, with the previously formed full sum digit being transferred simultaneously from flip-flop L1 to a register position which will appear at the same digit time during the next minor cycle. Each stored logic code (3) then retains the previous register digit so that it reappears at the same position during the next minor cycle; formulates the full sum with the multiplicand being gated by multiplier signal L4 and the result being entered into flip-flop L1; and formulates the full carry, again with the multiplicand being gated according to signal L4, and the result being entered into flip-flop L2.

It will be noted that each formation of a new partial product shifts the partial product one binary position to the left, so that the final product represented as the number "P" appears in digit positions 3, 5, 7, 9, 11, 13, 15, and 17 during minor cycle 6, and constitutes the binary number 11000011.

It should be evident from this discussion that a similar multiplication process may be performed by successively subtracting the multiplicand from the previously accumulated partial product. In this case, of course, the product will be negative. The function of stored logic codes may be determined by substituting L3=1 into the equations.

In the above multiplication operation, the partial products have been formed by addition and shifted in a simultaneous operation. A simpler logical system is possible by using the addition logic of Table V above and then performing the shift during a separate minor cycle. Subtraction may then be performed according to the logic of Table V*a*, a combined logic for both addition and subtraction being accomplished by incorporating signal L3 to separate the positive and negative carries.

The stored logic code definition for a system of this type may be expressed as follows:

TABLE VIII*a*

Figure 4B:
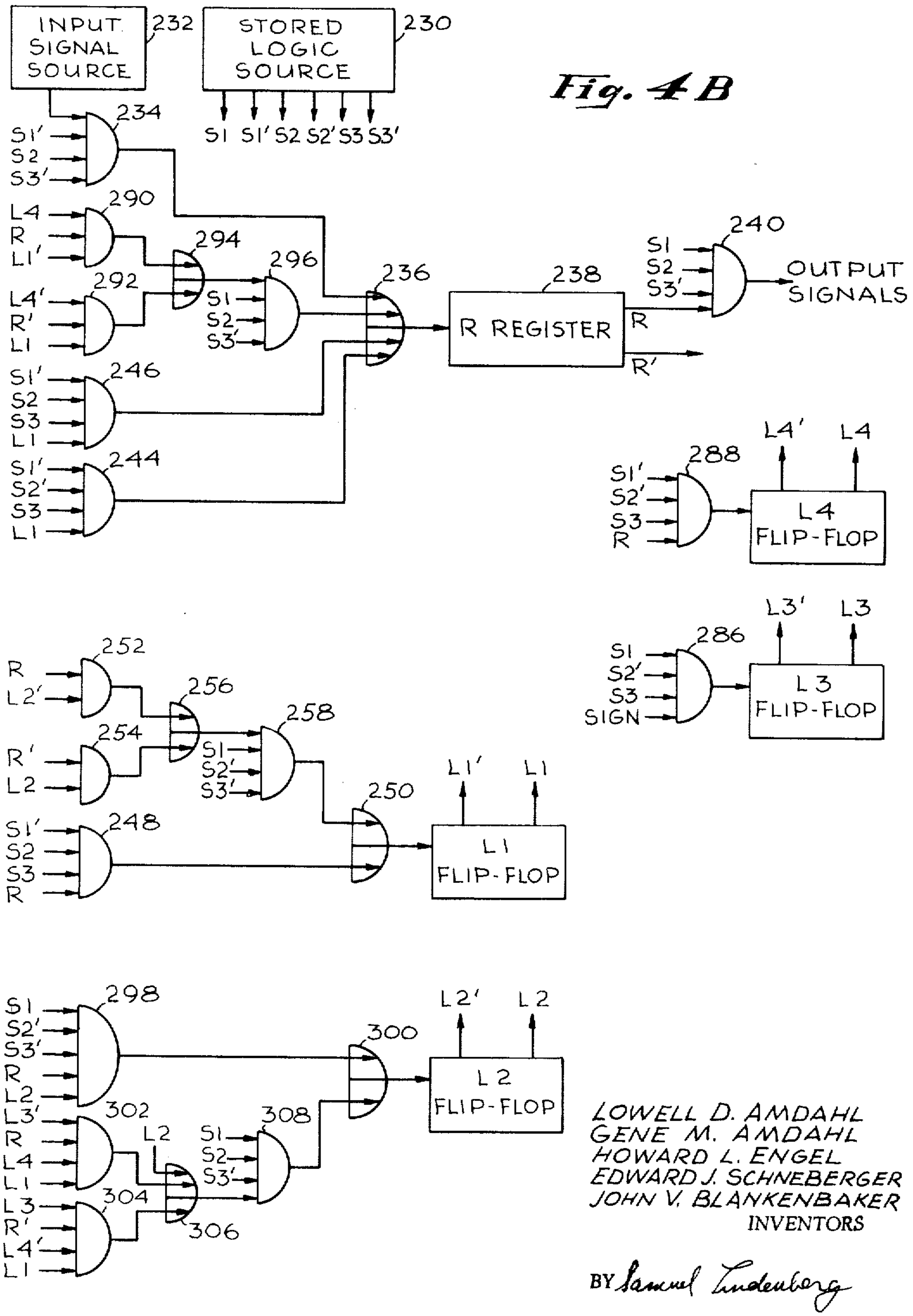

(0)
(1) toR=I; output=R
(2) toL1=RL2′+R′L2; toL2=R.L2
(3) toR=L4.R.L1′+L4′.R′.L1; toL2=L2 +L3′.(R.L4).L1+L3.(R′.L4)′.L1
(4) toR=L1; toL4=R
(5) toR=L1; toL1=R
(6) toL3=sign of operation FIGURE 4B is a block schematic diagram of a computer which can respond to the stored logic code specified under Table VIII*a*. Similar functioning apparatus to that shown in FIGURE 4A bears the same reference numeral. Thus, the structure for responding to stored logic command (1) is identical with that shown in FIGURE 4A. Also identical is the gating structure associated with flip-flops L3 and L4 and these are given the same reference numerals. The inputs toR for stored logic command (4) and (5) are the same for FIGURES 4A and 4B. Thus the gating structure bears the identical reference numerals here. The other input toR upon the occurrence of the stored logic command (3) is effectuated by an "and" gate 290 having as its input the output of L4, the output of the R register, and the complement of L1, or L1′. Another "and" gate 292 has as its input L4′, R′ and L1. The output of the "and" gates 290 and 292 are applied to an "or" gate 294. The output of the "or" gate is applied to a succeeding "and" gate 296. This "and" gate 296 also has as its gating input the (3) command as exemplified by stored logic signals S1, S2 and S3′. The output of the "and" gate 296 drives the "or" gate 236.

Upon the occurrence of the (5) stored logic command the input to L1 is the output of the R register. This is effectuated by an "and" gate 248 as in FIGURE 4A. The other input to L1 occurs upon the issuance of stored logic command (2). The structure for this is identical with that shown in FIGURE 4A, since the identical function is called for.

Upon the issuance of the stored logic command (2) an "and" gate 298 is gated open to pass the "anded" combination of the R and L2 signals to an "or" gate 300. Upon the issuance of the stored logic command (3), the required input function is effectuated by an "and" gate 302 having as its input the complemented output of L3, or L3′ the output of the R register, L4 and L1. The second "and" gate 304 has as its input the output of the flip-flop L3, the primed output of the register R or R′, L4′ and L1. The outputs of "and" gates 302 and 304 are applied to an "or" gate 306 which has as another input the output of the L2 flip-flop. The output of the "or" gate 306 is applied to an "and" gate 308. This "and" gate is gated only upon the appearance of the stored logic signals S1, S2 and S3′. The output of the "and" gate 308 is applied to the "or" gate 300 to drive the L2 flip-flop accordingly.

It may be noted as a matter of interest that the logic for flip-flop L2 is simplified for stored logic code (2) in view of the fact that the half carries for subtraction and addition are the same. The operation for multiplication is similar to the addition operation illustrated above in Table VII where the accumulated product would be the number B and A is the multiplicand. After each minor cycle during which addition is performed, a shifting cycle is performed which shifts the partial product in the direction of increasing significance. Thus, the B digits in Table VII would be shifted to the right by stored logic code (5) of Table VIII*a*.

As a final illustration of the range of versatility inherent in the stored logic code approach of the invention, various forms for stored logic codes (2) and (3) will be illustrated. Each definition will be accompanied with an example showing the manner of operation. In some instances, it will be noted that a simultaneous shift of the result is performed, while in others the result is entered directly into the register without a shift. It will be understood, of course, that this illustration does not exhaust the various possibilities.

be two separate registers since these digits may be biplexed, that is, alternated in position. It will be shown below, however, that the same logic applies to the use of separate registers for numbers A and B. The number A in each example is the accumulated number and, therefore, may also correspond to a previous partial product. The number P then is the result of the operation

TABLE X

| | | | | | | | | | | | | | | |
|---|---|---|---|---|---|---|---|---|---|---|---|---|---|---|
| Example 1.—$P=A+B$ | | | | | | | | | | | | | | |
| 0 | | 0 | | 0 | | 1 | | 0 | | 1 | | A | R | |
| | 0 | | 0 | | 1 | | 1 | | 0 | | 1 | B | | |
| 0 | 1 | 1 | 0 | 0 | 1 | 1 | 1 | 1 | 1 | 1 | 0 | L1 | | (2) toL1=R (+) L2; toL2=R.L2 |
| 0 | 0 | 0 | 1 | 1 | 1 | 0 | 0 | 0 | 1 | 0 | 0 | L2 | | (3) toR=R (+) L1; toL2=+R.L1 |
| 3 | 2 | 3 | 2 | 3 | 2 | 3 | 2 | 3 | 2 | 3 | 2 | S | | |
| | | 1 | | 0 | | 0 | | 1 | | 0 | | P | R | |
| Example 2.—$P=(A+B)$ shifted | | | | | | | | | | | | | | |
| 0 | | 0 | | 1 | | 1 | | 0 | | 1 | | B | R | |
| | 0 | | 0 | | 0 | | 1 | | 0 | | 1 | A | | |
| 0 | 1 | 1 | 0 | 1 | 0 | 1 | 1 | 1 | 0 | 1 | 0 | L1 | | (2) toR=L1; toL1=R (+) L2; toL2=R.L2 |
| 0 | 0 | 0 | 1 | 0 | 1 | 0 | 0 | 0 | 1 | 0 | 0 | L2 | | (3) toL1=R (+) L1; toL2=L2+R.L1 |
| 3 | 2 | 3 | 2 | 3 | 2 | 3 | 2 | 3 | 2 | 3 | 2 | S | | |
| | 1 | | 0 | | 0 | | 1 | | 0 | | | P | R | |
| Example 3.—$P=A-B$ | | | | | | | | | | | | | | |
| 0 | | 1 | | 0 | | 0 | | 1 | | 0 | | A | R | |
| | 0 | | 0 | | 1 | | 1 | | 0 | | 1 | B | | |
| 0 | 1 | 1 | 0 | 0 | 1 | 1 | 1 | 1 | 1 | 1 | 0 | L1 | | (2) toL1=R (+) L2; toL2=R.L2 |
| 0 | 0 | 0 | 1 | 1 | 1 | 0 | 0 | 0 | 1 | 0 | 0 | L2 | | (3) toR=R (+) L1; toL2=L2+R'.L1 |
| 3 | 2 | 3 | 2 | 3 | 2 | 3 | 2 | 3 | 2 | 3 | 2 | S | | |
| 0 | | 0 | | 0 | | 1 | | 0 | | 1 | | P | R | |
| Example 4.—$P=(A-B)$ shifted | | | | | | | | | | | | | | |
| | 0 | | 1 | | 0 | | 0 | | 1 | | 0 | A | R | |
| 0 | | 0 | | 1 | | 1 | | 0 | | 1 | | B | | |
| 0 | 0 | 0 | 0 | 1 | 1 | 0 | 0 | 0 | 1 | 0 | 0 | L1 | | (2) toR=L1; toL1=R (+) L2; toL2=R'.L2 |
| 0 | 0 | 0 | 1 | 1 | 1 | 0 | 0 | 0 | 1 | 0 | 0 | L2 | | (3) toL1=R (+) L1; toL2=L2+R.L1' |
| 3 | 2 | 3 | 2 | 3 | 2 | 3 | 2 | 3 | 2 | 3 | 2 | S | | |
| | 0 | | 0 | | 1 | | 0 | | 1 | | | P | R | |
| Example 5.—$P=B-A$ | | | | | | | | | | | | | | |
| | | | 1 | | 0 | | 0 | | 1 | | 0 | B | R | |
| | | 0 | | 1 | | 1 | | 0 | | 1 | | A | | |
| | | 0 | 1 | 1 | 0 | 0 | 0 | 0 | 0 | 0 | 0 | L1 | | (2) toL1=R(+)L2; toL2=R'.L2 |
| | | 0 | 1 | 1 | 1 | 0 | 0 | 0 | 1 | 0 | 0 | L2 | | (3) toR= R(+)L1; toL2=L2+R.L1' |
| | | 3 | 2 | 3 | 2 | 3 | 2 | 3 | 2 | 3 | 2 | S | | |
| | | 0 | | 0 | | 1 | | 0 | | 1 | | P | R | |
| Example 6.—$P=(B-A)$ shifted | | | | | | | | | | | | | | |
| 0 | | 1 | | 0 | | 0 | | 1 | | 0 | | B | R | |
| | 0 | | 0 | | 1 | | 1 | | 0 | | 1 | A | | |
| | 0 | 1 | 0 | 0 | 1 | 1 | 0 | 1 | 1 | 1 | 0 | L1 | | (2) toR=L1; toL1=L2(+)R; toL2=R.L2 |
| | 0 | 0 | 1 | 1 | 1 | 0 | 0 | 0 | 1 | 0 | 0 | L2 | | (3) toL1=L1(+)R; toL2=R'.L1+L2 |
| | 2 | 3 | 2 | 3 | 2 | 3 | 2 | 3 | 2 | 3 | 2 | S | | |
| | 0 | | 0 | | 1 | | 0 | | 1 | | | P | R | |

The letters A and B are utilized in the examples of Table X to separate the two binary numbers in register R. It will be understood, of course, that there need not and is always entered into the same position as number A, that is, the result is effectively accumulated.

Each example is identified as either the sum of A and

B or the difference between A and B or B and A. In some examples, the result is shifted so that the binary digits in number P appear in corresponding more significant digital places than the number A.

Three binary numbers 10010 (18), 1101 (13), and 101 (5) are used throughout to simplify the comparison of the examples. In Example 1, the number A (5) is added to the number B (13) and the result (18) is accumulated without any shift, that is, the number P occupies the same relative position as did the number A. The logic for codes (2) and (3) it will be noted is similar to that described above with reference to Table V. It will be noted, however, that code (2) does not specify the resetting of the register to zero, which may not be necessary, and that code (3) does not specify any change for flip-flop L1 and the carry function is continuously generated in flip-flop L2.

In Example 2, the full sum is entered into flip-flop L1 before it is stored in register R resulting in a shift of the result. This logic then is similar to the addition logic of Table VIII although the multiplier variable L4 is not shown.

In Example 3, a subtraction is performed without shift, the logic being very similar to that of Example 1 except that code (3) specifies a modification for the function toL2.

Example 4 is the subtraction equivalent of Example 2, the logic being the same except for the functions toL2 in both codes (2) and (3).

Examples 5 and 6 show how the logic must be modified to permit the subtraction $B-A$. In this case, the previously accumulated number A is subtracted from the new number B. It may be noted with interest that the logic of Example 5 where subtraction is performed without shift is similar to that of Example 4 where the subtraction $A-B$ is performed with a shift and that the logic of Example 6 is similar to that of Example 3 where the subtraction $A-B$ is performed without a shift. This, of course, provides the possibility of combining the two types of logic to permit either type of subtraction.

From the above examples, it should be evident that the stored logic code approach of the invention permits almost an infinite range of variations in computing techniques with a very simple logical network and a minimum of logical flip-flops. Specific logic for network L has not been derived to correspond to each of the examples given since this derivation should be apparent from the previous derivations above, such as those obtained from Tables VI and VI*a*. The important concept introduced by the invention is that the utilization of stored logic codes to represent elementary logical operations permits the development of a computer which may be the essence of simplicity but yet may be capable of performing even the most complex arithmetic operations.

Figure 5:
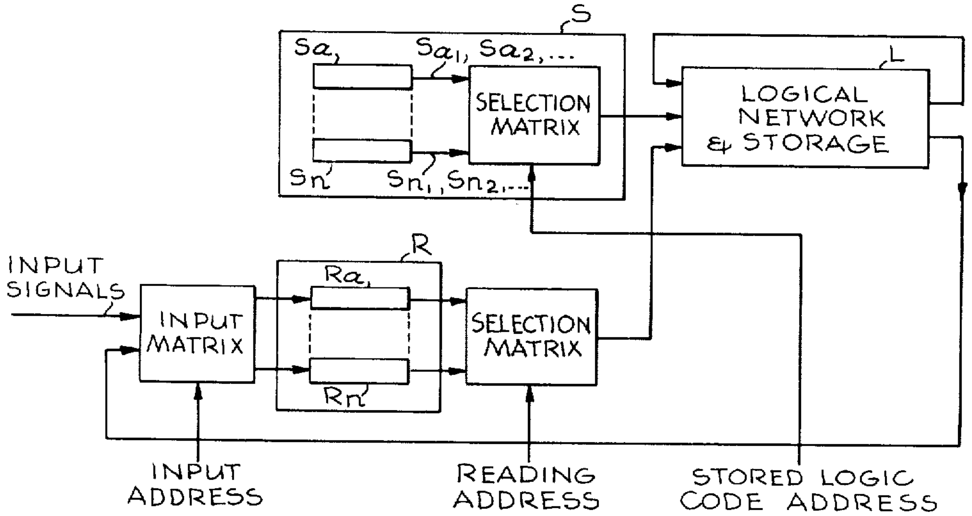
FIGURE 5 is a generalized block diagram arrangement representing the form of the computer which employs a plurality of memory channels and a plurality of registers.

In the discussion thus far, register R has contained only a single register and code generator S has produced only a single series of code sets. Some general observations may now be made, reference being made to FIGURE 5, as to how the basic concepts thus far developed may be extended to more complicated systems. In FIGURE 5, it is noted that code generator S includes a plurality of generating means S*a* . . . S*n*, where *n* is employed to indicate that any number of generating means may be included. Generating means S*a* produces a series of code sets out of the group S*a*1, S*a*2 . . . . These may correspond to the codes (0), (1), and so forth such as have been illustrated above. In a similar manner, generating means S*n* as well as any other means included in generator S produces a series of stored logic code sets.

The output signals of the generating means in device S are applied to a selection matrix controlled by signals representing the stored logic code address. The selection matrix then is operative to read the stored code from the generating means identified by the code address. Logical network L may be defined as above to perform the function specified by the code read from means S.

In addition to having a plurality of code signal generators, it is also possible to have a plurality of registers. These are identified as registers R*a* . . . R*n*, the letter *n* indicating that any number may be employed. Input signals then may be entered into the desired register through an input matrix controlled in accordance with signals constituting an input address and output signals are read from a selected register by means of a selection matrix controlled by signals representing a reading address. In other respects, the arrangement of FIGURE 5 is similar to that of FIGURE 1.

The embodiment of FIGURE 5 may be adapted to perform any of the operations indicated above at very high speed. This may be accomplished, for example, by entering the stored logical codes corresponding to different minor cycles into separate generating means in device S. Then instead of performing operations in any predetermined sequential order, they may be performed immediately upon receipt of a code address identifying the code sequence corresponding to the operation desired.

The use of a plurality of registers in means R permits the selection of numbers in accordance with the reading address from any one of a plurality of memory channels. In a similar manner, the results of operations may be entered into any one of a plurality of registers. The manner in which a memory may be operated to permit this selective operation is well known in the art and will not be described further here. The purpose of the present discussion is to point out the fact that the stored logic computer of the present invention may readily be incorporated as the arithmetic portion of a conventional computer system and is not in any way limited to small scale computing systems.

It will also be understood that while serial logic has been described throughout, in fact the same approach may be profitably employed for parallel computing. For example, a parallel adder may be mechanized by duplicating the logical network L in as many binary positions as there are binary digits in the numbers to be operated upon.

Accordingly, it should be apparent to those skilled in the art that the invention is not limited to the few illustrations herein but rather will find many other applications and may assume a wide variety of different embodiments.

We claim:

1. A digital computer comprising a first storage device for storing a plurality of code digit sets, respective code digit sets representing at least the following: input or output function, logical function, storage function; means for deriving from said first storage device signal sets corresponding to said code digit sets during successive time intervals corresponding to computer digit times, a second storage device for storing digital signals representing a quantity to be operated upon, a source of digital signals representing a quantity to be operated upon, means responsive to an input or output function signal set derived from said first storage device for entering a quantity from said source into said second storage device, means for producing signals representative of stored digital signals from said second storage device during successive computer digit times, and means responsive to the successively derived signal sets and to the then produced signal from said second storage device for performing the function specified by the signal set.

2. A stored logic computer comprising means for receiving input digit signals and for producing output digit signals representative of the received input digit signals, means for producing a plurality of code digit signal sets during successive digit time intervals, each code digit signal set representing a predetermined function, means responsive to an output digit signal and a concurrently produced code digit signal set for producing resultant signals representative of an operation on said output digit signal in accordance with the predetermined function represented by said code digit signal, and means for utilizing said resultant signals responsive to a succeedingly produced code digit signal set in accordance with the predetermined function represented thereby.

3. The combination comprising a digit storage device for receiving input digit signals and producing corresponding output digit signals after a predetermined delay, a stored logic code generator for producing signal sets each representative of a desired predetermined logical function, including input or output function and logical function, first logical circuit and storage means to which said output digit signals and a signal set representative of a logical function are applied for effectuating the specified logical function on said output digit signals and storing the resultant signal, and second logical circuit means having its output connected to said digit storage device and to the input of which said resultant signal and signal set representative of an input or output function are applied for transferring said resultant signal into said digit storage device.

4. The combination defined in claim 3 wherein said predetermined logical function includes an "and" function.

5. The combination defined in claim 3 wherein said predetermined logical function includes a nonexclusive "or" function.

6. The combination defined in claim 3 wherein said predetermined logical function is the logical product of a first variable and the complement of a second variable.

7. The combination defined in claim 3 wherein said predetermined logical function is a nonexclusive "or" function of a first variable and the complement of a second variable.

8. The combination defined in claim 3 wherein said predetermined logical function includes an exclusive "or" function.

9. The combination comprising a digit-storage device including a flip-flop element L and a register R for receiving input digit signals and producing corresponding output digit signals after a predetermined delay; a logical code-storage device for producing signal sets including at least two bivalued signals S1 and S2 coded to represent respective functions including (1) input or output, and (2) logical function; and logic network means coupled to said flip-flop element L and responsive to said output digit signals and to signals S1 and S2 for entering an input signal into register R or producing an output signal representing the contents of register R, and for producing a signal representing a logical function of the signal stored in flip-flop element L and a signal stored in register R.

10. The combination recited in claim 9 wherein said logic network coupled to said flip-flop element L and responsive to said output digit signals and to signals S1 and S2 includes a gate circuit for logically combining the present output of said flip-flop element L and the complement of the present output of the register R for producing a resultant signal representative of the combined inputs, and means for applying said resultant signal to said flip-flop element L to be stored therein.

11. The combination recited in claim 9 wherein said logic network coupled to said flip-flop element L and responsive to said output digit signals and to signals S1 and S2 includes a gate circuit to which is applied the present output of said flip-flop element L and the complement of the present output of the register R for producing a resultant signal representative of either input, and means for applying said resultant signal to said flip-flop element L to be stored therein.

12. The combination recited in claim 9 wherein said logic network coupled to said flip-flop element L and responsive to said output digit signals and to signals S1 and S2 includes first gate-circuit means for producing a first resultant signal responsive to the present output of said flip-flop circuit and to the complement of the present output of said register, second gate circuit means for producing a second resultant signal responsive to the complement of the present output of said flip-flop circuit and the present output of said register, and third gate-circuit means for applying one of said first or said second resultant signals to said flip-flop element L to be stored therein.

13. The combination comprising means for producing binary-coded signal sets respectively identifying predetermined functions of binary variables, a source of binary signals, means coupled to said source for receiving and storing said binary signals and for producing corresponding output signals, and third means responsive to each binary-coded signal set and to the then produced output signal of said second means for performing a logical binary operation upon said output signal in accordance with the received binary-coded signal set, said first means being adapted to produce a binary-coded signal set to identify an elementary binary operation for each binary output signal produced by said third means.

14. A stored logic computer comprising a code-signal generator S producing a series of sets of signals S1 and S2, each signal having either of two binary values, 0 and 1, said sets being produced during successive binary digit intervals, a source of binary signals, a storage device for receiving binary signals from said source and for cyclically producing corresponding output signals R, and a logical network and storage device L responsive to signals S1, S2, and R for performing predetermined logical operations upon signal R in accordance with the function specified by the binary values of signals S1 and S2.

15. A stored logic computer as defined in claim 14 wherein said signals S1 and S2 are coded to represent four basic functions respectively (0) representing no changes in binary values R or L, (1) input or output function, (2) first logical function, and (3) second logical function, said storage device and said logical network and storage device each includes means for inserting their respective output signals into their respective inputs responsive to the application of S1 and S2 signals representing (0), said storage device includes means for enabling an input from said source of binary signals to said storage device and for deriving an output from said storage device responsive to the application of S1 and S2 signals representing (1), said logical network and storage device includes means for providing an output signal representative of the logical combination of the present output of said logical network and storage device and the complement of the output of said storage device responsive to the application of S1 and S2 signals representing (2), and said storage device includes means for inserting therein the output of said logical network and storage device responsive to the application of S1 and S2 signals representing (3).

16. The stored logic computer defined in claim 14 wherein said logical network and storage device includes first and second storage elements.

17. A computer for performing addition or subtraction comprising first means for producing a series of code-signal sets, each set representing one of the following functions: no charge in variables, input or output, half sum and half carry, and second half sum and full carry; a source of binary input variables representing numbers to be added or subtracted, second means to which binary input variables representing numbers to be added or subtracted are applied from said source for producing corresponding output signals at the end of a predetermined computing cycle, said second means including means to produce an output signal synchronously with the operation of said first means so that a binary variable is produced thereby each time a code signal set is produced by said first means; a logical network for receiving the signals by said first and second means and for producing binary output signals, one signal being produced upon each receipt of a code signal set and a binary signal from said second means; and first and second storage elements for receiving signals produced by said logical network, said first storage element receiving a signal representing a half sum when specified by the corresponding code set while said second storage element receives the half carry.

18. The computer defined in claim 17 wherein said first and second storage elements produce signals L1, L1′, the complement of L1, and L2 respectively and wherein said second means produces signals R and R′, the complement of R, means for entering for storage said signals representing the half-sum function into said first storage element responsive to one of the logical combination of R and L1′ or the logical combination of R′ and L1, and means for entering a signal representative of the half-carry function into said second storage element responsive to a logical combination of signals R and L1.

19. The computer defined in claim 17 wherein said first and second storage elements produce signals L1 and L2, L2′, the complement of L2, respectively, and wherein said second means produces signals R, R′, the complement of R, means for entering said signals representing the half-sum function into said first storage element responsive to one of the logical combination of R′ and L2 or R and L2′, and means for entering the carry function into said second storage element responsive to the logical combination of R and L2.

20. The computer defined in claim 19 wherein there is included means for entering signals representing said second half-sum into said second means responsive to one of the logical combinations of R′ and L1 or R and L1′ and wherein there are means for entering signals representative of the full carry into said second storage element responsive to one of the functions L2 or the logical combination of R and L1.

21. The computer defined in claim 19 wherein there is included means for entering a second half-sum into said first storage element responsive to one of the functions comprising the logical combination of R′ and L1 or the logical combination of R and L1′, and means for entering signals representing a full carry into said second storage element responsive to one of the signal L2 or the signal resulting from the logical combination of R and L1.

22. The computer as defined in claim 19 wherein there is included means for entering signals representative of said second full sum into said second means responsive to one of the logical combination of signals R′ and L1 or the logical combination of signals R and L1′, and there is included means for entering signals representative of a full carry into said second storage element responsive to one of the signals L2 or the logical combination of R and L1.

23. A computer comprising a code signal generator S for producing signals S1, S2 and S3 having combinations of binary states representing predetermined stored logic codes; a register R for receiving binary input signals and for producing corresponding output signals at predetermined intervals; a network responsive to signals S1, S2, S3, and R for forming new binary signals in accordance with the stored logic specified by the signals produced by generator S; and a plurality of storage elements coupled to said network for receiving binary signals for temporary storage.

24. The computer defined in claim 23 wherein said plurality of storage elements includes flip-flops L1, L2, and L4, said computer being adapted to preform multiplication by utilizing element L4 to store the multiplier digits of numbers entered into said register R.

25. The computer defined in claim 23 wherein said plurality of flip-flops includes elements L1, L2, and L3, element L3 being adapted to receive the sign of an operation to control selection between addition and subtraction.

References Cited by the Examiner

UNITED STATES PATENTS 2,914,248 11/1959 Ross et al. ---------- 235—157

OTHER REFERENCES

Bolles et al.: "Control Elements in the Computer," August 1956, pp. 93–98.

ROBERT C. BAILEY, *Primary Examiner.*

DARYL W. COOK, MALCOLM A. MORRISON, *Examiners.*

UNITED STATES PATENT OFFICE
CERTIFICATE OF CORRECTION

Patent No. 3,246,303 April 12, 1966

Lowell D. Amdahl et al.

It is hereby certified that error appears in the above numbered patent requiring correction and that the said Letters Patent should read as corrected below.

Column 7, line 31, "mater" should read -- matic --. Column 8, line 47, "ipnut" should read -- input --. Column 13, line 58, "toL=L.(S1′+S2′)+S1.S2′.R" should read -- to L=L.(S1′+S2′)+S1.S2′.R′ --. Column 15, line 60, "(2) 1 0 toR=0; toL1=RL1′+R′L′;toL2=R.L1" should read -- (2) 1 0 toR=0; toL1=RL1′+R′L1;toL2=R.L1 --. Column 16, line 42, "gate" should read -- gates --. Column 21, line 54, "outpu" should read -- output --. Column 23, line 56, "(2) toR=L1;toL1′=R′.L2+R.L2′; toL2=L3′.R.L2+L3." should read -- (2) toR=L1;toL1=R′.L2+R.L2′;toL2=L3′.R.L2+L3. --. Columns 29 and 30, TABLE X, last column, about line 5 thereof, "(3) toR=R(+)L1; toL2=+R.L1" should read -- (3) toR=R(+)L1; toL2=L2+R.L1 --. Column 36, line 23, "preform" should read -- perform --.

Signed and sealed this 11th day of November 1969.

(SEAL)
Attest:

EDWARD M.FLETCHER,JR.
Attesting Officer

WILLIAM E. SCHUYLER, JR.
Commissioner of Patents